United States Patent
Kawai

(10) Patent No.: US 9,323,377 B2
(45) Date of Patent: Apr. 26, 2016

(54) PANEL CONTROL DEVICE, PANEL CONTROL METHOD, AND NON-TRANSITORY COMPUTER-READABLE MEDIUM

(71) Applicant: Junya Kawai, Nagoya (JP)

(72) Inventor: Junya Kawai, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 99 days.

(21) Appl. No.: 14/018,512

(22) Filed: Sep. 5, 2013

(65) Prior Publication Data

US 2014/0085234 A1    Mar. 27, 2014

(30) Foreign Application Priority Data

Sep. 26, 2012  (JP) .................................. 2012-211749

(51) Int. Cl.
 *G06F 3/041*  (2006.01)
(52) U.S. Cl.
 CPC ............ *G06F 3/0414* (2013.01); *G06F 3/0418* (2013.01)
(58) Field of Classification Search
 None
 See application file for complete search history.

(56) References Cited

U.S. PATENT DOCUMENTS

| 9,081,441 B2* | 7/2015 | Chang et al. |
| 2006/0017709 A1 | 1/2006 | Okano |
| 2011/0291944 A1* | 12/2011 | Simmons et al. ............. 345/173 |
| 2012/0007825 A1 | 1/2012 | Kim et al. |

FOREIGN PATENT DOCUMENTS

| JP | 7306752 | 11/1995 |
| JP | 2006039686 | 2/2006 |
| JP | 2009217442 | 9/2009 |
| JP | 2010129034 | 6/2010 |
| JP | 2012018660 | 1/2012 |

OTHER PUBLICATIONS

Office Action issued in Japanese Application No. 2012-211749 on Feb. 23, 2016.

* cited by examiner

*Primary Examiner* — Kenneth B Lee, Jr.
(74) *Attorney, Agent, or Firm* — McCarter & English, LLP

(57) ABSTRACT

A panel control device includes a processor. The processor is configured to perform processes including acquiring a plurality of pressed cells and a plurality of cell coordinates, the plurality of pressed cells being a plurality of cells, among pluralities of cells that divide a panel into a plurality of regions, to which pressing forces are applied simultaneously, and each of the plurality of cell coordinates being coordinate information that indicates a position within one of the pressed cells to which the pressing forces have been applied, specifying, as at least one candidate cell, at least one of the plurality of pressed cells based on positional relationships among the plurality of cell coordinates included in an adjacency group, and specifying designation coordinates based on cell coordinates, among the plurality of cell coordinates, that indicates a position within the at least one candidate cell.

10 Claims, 26 Drawing Sheets

FIG. 8

| CYCLE | TIME INFORMATION | PRESSED CELLS | | CELL COORDINATES | | PRESSING FORCE | FLAG INFORMATION |
|---|---|---|---|---|---|---|---|
| | | Cell_X | Cell_Y | X | Y | | |
| 0 | 0 | 2 | 3 | 254 | 2 | | ○ |
| | 0 | 2 | 4 | 254 | 254 | | ○ |
| | 0 | 3 | 3 | 2 | 2 | | ○ |
| | 0 | 3 | 4 | 2 | 254 | | ○ |
| | 0 | 8 | 11 | | | | × (1st) |
| | 0 | 8 | 12 | | | | × (1st) |
| | 0 | 8 | 13 | | | | × (1st) |
| | 0 | 8 | 14 | | | | × (1st) |
| | : | : | : | : | : | : | : |
| 1 | 0.01 | 3 | 3 | 254 | 2 | | ○ |
| | : | : | : | : | : | : | : |
| 2 | 0.02 | 3 | 3 | 254 | 2 | | ○ |
| : | : | : | : | : | : | : | : |
| 154 | 1.54 | 3 | 3 | 254 | 2 | | ○ |

| ADJACENCY GROUP | PRESSED CELL | PRESSING FORCE |
|---|---|---|
| 61 | (2, 3) | ○○ |
| 62 | (7, 4) | × × |
| 64 | (9, 19) | △△ |
| 65 | (6, 18) | ◎◎ |

| NUMBER | TIME INFORMATION | PRESSED CELLS | | CELL COORDINATES | | 133 |
|---|---|---|---|---|---|---|
| | | Cell_X | Cell_Y | X | Y | |
| 0 | 0 | 2 | 3 | 254 | 2 | |
| | | 2 | 4 | 254 | 254 | |
| | | 3 | 3 | 2 | 2 | |
| | | 3 | 4 | 2 | 254 | |
| | | : | : | : | : | |
| 1 | 0.01 | : | : | : | : | |
| 2 | 0.02 | : | : | : | : | |
| : | : | : | : | : | : | |
| N-1 | : | : | : | : | : | |

PANEL CONTROL DEVICE, PANEL CONTROL METHOD, AND NON-TRANSITORY COMPUTER-READABLE MEDIUM

CROSS-REFERENCE TO RELATED APPLICATION

This application claims priority to Japanese Patent Application No. 2012-211749, filed Sep. 26, 2012, the content of which is hereby incorporated herein by reference in its entirety.

BACKGROUND

The present disclosure relates to a panel control device that may control a touch panel on which writing may be performed by pressing on a panel face with a stylus, a fingertip, or the like, as well as to a panel control method and a non-transitory computer-readable medium.

A touch panel is known on which writing can be performed by pressing on a panel face with a stylus, a fingertip, or the like (hereinafter referred to as the input portion). With this sort of touch panel, there are cases in which, in the course of the writing by the input portion, the panel face is pressed by something other than the input portion, such as the palm of a hand, a knuckle, an arm, a wristwatch, an item of clothing, or the like. In this sort of case, it is necessary to distinguish between an area that has been pressed by the input portion and an area that has been pressed by something other than the input portion.

A technology has been disclosed that distinguishes between an area pressed by a fingertip and an area pressed by a portion of the palm of a hand, according to the surface area of the pressed area, for example. With this technology, in a case where the surface area of the pressed area is small, a determination is made that the pressed area has been pressed by a fingertip. In contrast, in a case where the surface area of the pressed area is large, a determination is made that the pressed area has been pressed by a portion of the palm of a hand.

SUMMARY

The surface area of an area pressed by something other than the input portion is not limited to always being larger than the surface area of an area pressed by the input portion. Therefore, there are cases in which an area pressed by the input portion and an area pressed by something other than the input portion cannot be clearly distinguished from one another, even in a case where the technology described above is applied.

Embodiments of the broad principles derived herein provide a panel control device that can distinguish between and recognize an area pressed by the input portion and an area pressed by something other than the input portion, and the embodiments also provide a panel control method and a non-transitory computer-readable medium.

Various embodiments provide a panel control device includes a processor. The processor is configured to perform processes including acquiring a plurality of pressed cells and a plurality of cell coordinates, the plurality of pressed cells being a plurality of cells, among pluralities of cells that divide a panel into a plurality of regions, to which pressing forces are applied simultaneously, and each of the plurality of cell coordinates being coordinate information that indicates a position within one of the pressed cells to which the pressing forces have been applied, specifying, as at least one candidate cell, at least one of the plurality of pressed cells based on positional relationships among the plurality of cell coordinates included in an adjacency group, the adjacency group being a plurality of pressed cells that are adjacent to one another, and specifying designation coordinates based on cell coordinates, among the plurality of cell coordinates, that indicates a position within the at least one candidate cell, the designation coordinates being coordinate information that indicate a position on the panel designated by being pressed by a user.

Embodiments also provide a panel control method including acquiring a plurality of pressed cells and a plurality of cell coordinates, the plurality of pressed cells being a plurality of cells, among pluralities of cells that divide a panel into a plurality of regions, to which pressing forces are applied simultaneously, and each of the plurality of cell coordinates being coordinate information that indicates a position within one of the pressed cells to which the pressing forces have been applied, specifying, as at least one candidate cell, at least one of the plurality of pressed cells based on positional relationships among the plurality of cell coordinates included in an adjacency group, the adjacency group being a plurality of pressed cells that are adjacent to one another, and specifying designation coordinates based on cell coordinates, among the plurality of cell coordinates, that indicates a position within the at least one candidate cell, the designation coordinates being coordinate information that indicate a position on the panel designated by being pressed by a user.

Embodiments further provide a non-transitory computer-readable medium storing computer-readable instructions that cause a device to perform the steps of acquiring a plurality of pressed cells and a plurality of cell coordinates, the plurality of pressed cells being a plurality of cells, among pluralities of cells that divide a panel into a plurality of regions, to which pressing forces are applied simultaneously, and each of the plurality of cell coordinates being coordinate information that indicates a position within one of the pressed cells to which the pressing forces have been applied, specifying, as at least one candidate cell, at least one of the plurality of pressed cells based on positional relationships among the plurality of cell coordinates included in an adjacency group, the adjacency group being a plurality of pressed cells that are adjacent to one another, and specifying designation coordinates based on cell coordinates, among the plurality of cell coordinates, that indicates a position within the at least one candidate cell, the designation coordinates being coordinate information that indicate a position on the panel designated by being pressed by a user.

BRIEF DESCRIPTION OF THE DRAWINGS

Embodiments will be described below in detail with reference to the accompanying drawings in which:

FIG. 8 is a figure that shows a pressed cell table;

FIG. 13 is a figure that shows a separation table;

FIG. 18 is a figure that shows a pressing force table;

FIG. 25 is a figure that shows a history table; and

DETAILED DESCRIPTION

Figure 1:
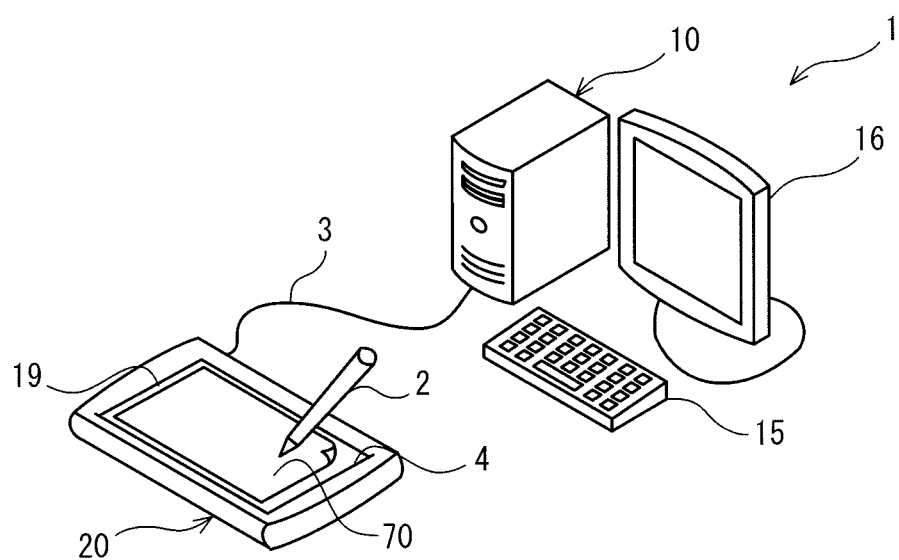
FIG. 1 is a figure that shows a handwriting input system.

Hereinafter, an embodiment of the present disclosure will be explained with reference to the drawings. A handwriting input system 1 will be explained with reference to FIG. 1. The handwriting input system 1 is a system for specifying handwriting that has been written using a general-purpose writing instrument 2, converting the handwriting to electronic form, and then storing converted data as handwriting data. The handwriting input system 1 includes a PC 10 and an electronic writing device 20. The PC 10 and the electronic writing device 20 may be connected through a communications cable 3.

The electronic writing device 20 includes a recessed receptacle portion 4 on a top face of the electronic writing device 20. A touch panel 19 is provided on a bottom face of the receptacle portion 4. The shape of the touch panel 19 is approximately rectangular. The touch panel 19 may be operated by a resistance film system. In a case where, in conjunction with a writing operation by the writing instrument 2, the touch panel 19 is pressed by the tip of the writing instrument 2, the pressed position is specified. Information that indicates the specified position is transmitted from the electronic writing device 20 to the PC 10 through the communications cable 3.

A user places a paper medium 70, for example, on the touch panel 19 of the electronic writing device 20. The user may write on the paper medium 70 by using the writing instrument 2 (a ballpoint pen, a mechanical pencil, or the like). A line drawing is drawn on the paper medium 70. At the same time, a pressing force is applied to the touch panel 19 by the writing operation of the writing instrument 2. Information that indicates the pressed position is transmitted from the electronic writing device 20 to the PC 10. The PC 10 specifies the handwriting based on the information that is received from the electronic writing device 20. The specified handwriting is output to an output portion 16 (a display) of the PC 10. Through the output portion 16, the user can check the handwriting by the writing instrument 2 at the same time that the user may use the writing instrument 2 to draw the line drawing on the paper medium 70.

The device that is connected to the electronic writing device 20 can be changed. For example, the electronic writing device 20 may also be connected to a mobile telephone, a smart phone, a tablet PC, or the like. The electronic writing device 20 and the PC 10 may also be connected through a network such as the Internet or the like, and they may also be connected wirelessly. The writing instrument 2 that performs the writing on the electronic writing device 20 may also be a dedicated stylus or a finger.

Figure 2:
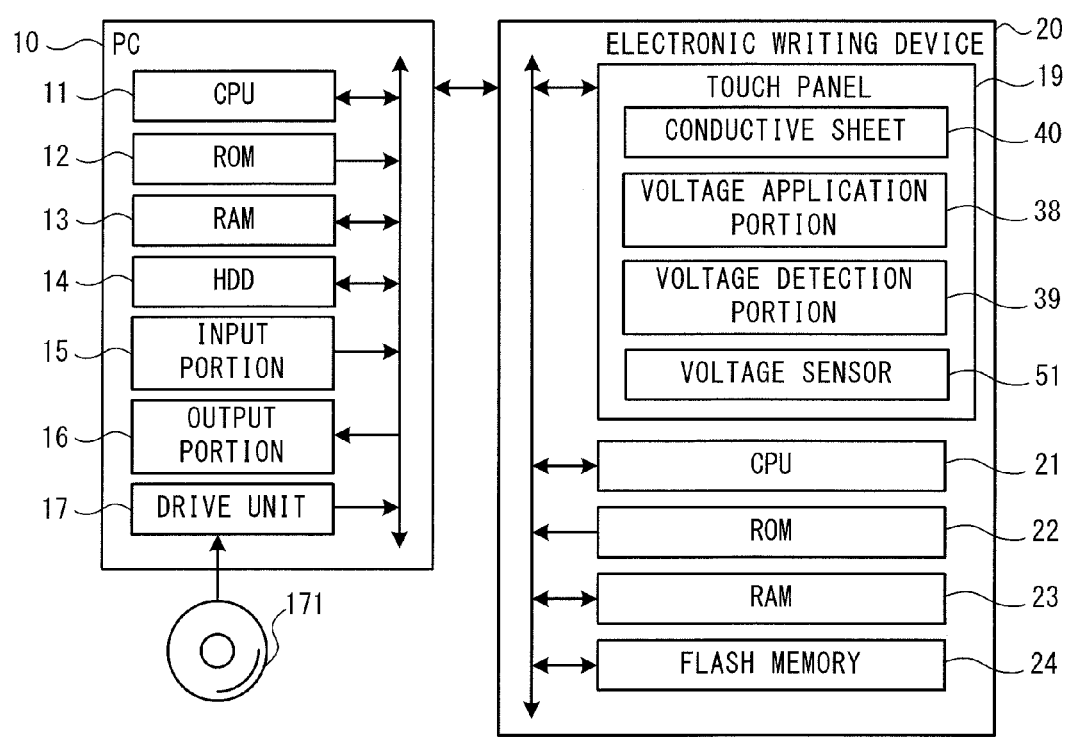
FIG. 2 is a block diagram that shows electrical configurations of a PC and an electronic writing device.

Electrical configurations of the PC 10 and the electronic writing device 20 will be explained with reference to FIG. 2. The PC 10 includes a CPU 11, a ROM 12, a RAM 13, a hard disk drive (hereinafter referred to as the HDD) 14, an input portion 15, an output portion 16, and a drive unit 17. The CPU 11 is configured to perform control of the entire PC 10. A boot program, an OS, and initial data are stored in the ROM 12. Temporary data may be stored in the RAM 13. A separation table 131 (refer to FIG. 13), a pressing force table 132 (refer to FIG. 18), a history table 133 (refer to FIG. 25), and the like may also be temporarily stored in the RAM 13. Programs for the CPU 11 may be stored in the HDD 14. A pressed cell table 141 (refer to FIG. 8), a separation template 142 (refer to FIG. 12), and the like may also be stored in the HDD 14. The input portion 15 is one of a keyboard and a mouse that accepts operations for the PC 10. The output portion 16 is a display that can output an image. The drive unit 17 may reads information stored in a storage medium 171. For example, a program stored in the storage medium 171 is read by the drive unit 17 and is stored in the HDD 14. The CPU 11 may perform processing based on the program stored in the HDD 14.

The programs stored in the HDD 14 may also be acquired through a network (the Internet or the like) that is connected to a communications driver that is not shown in the drawings. The CPU 11 may also store programs received through the network in the HDD 14.

The electronic writing device 20 includes a CPU 21, a ROM 22, a RAM 23, a flash memory 24, and the touch panel 19. The CPU 21 is configured to perform control of the entire electronic writing device 20. A boot program and initial data are stored in the ROM 22. Temporary data may be stored in the RAM 23. Programs for the CPU 21 may be stored in the flash memory 24. The touch panel 19 includes a conductive sheet 40, a voltage application portion 38, a voltage detection portion 39, and a plurality of pressure sensors 51.

Figure 3:
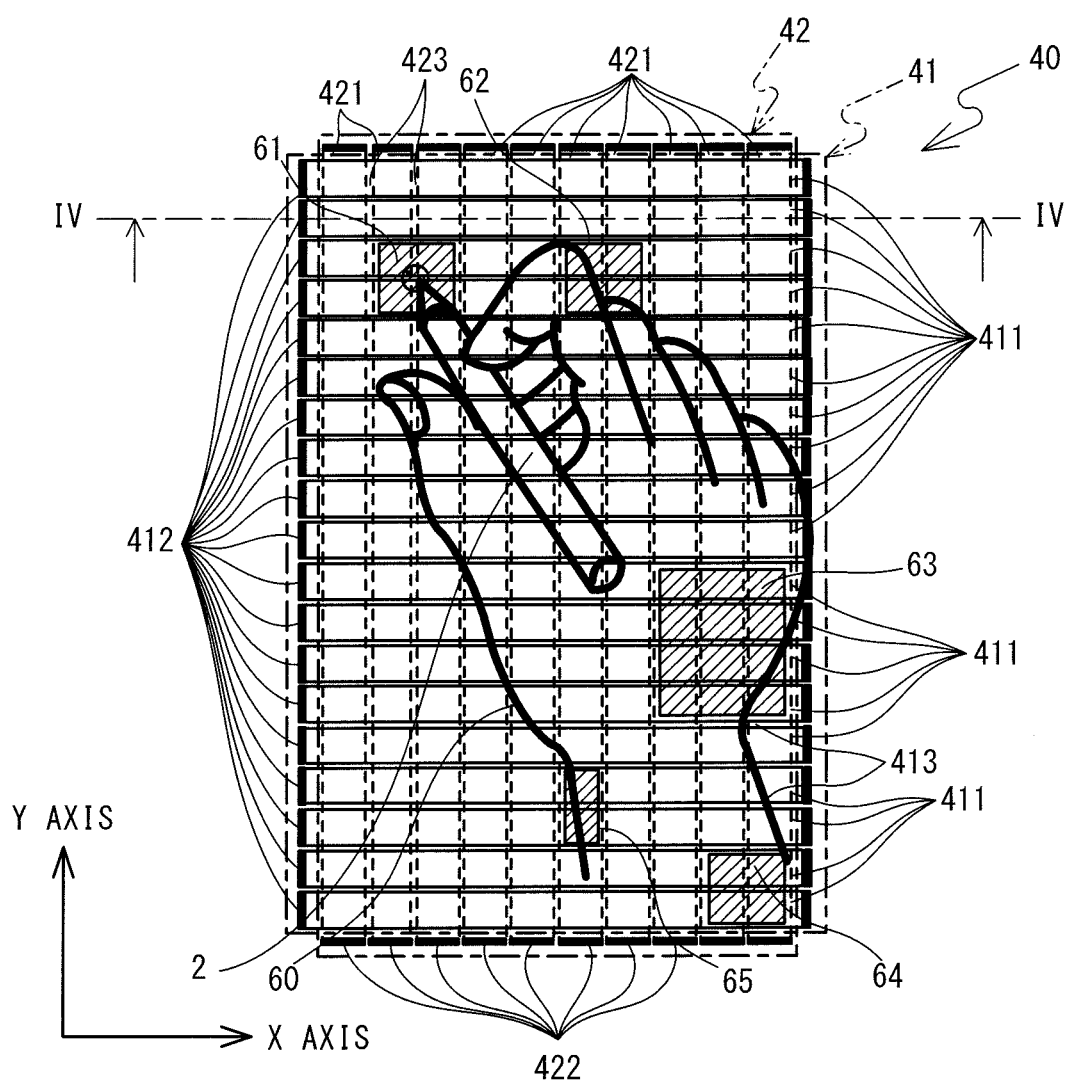
FIG. 3 is a figure that shows a conductive sheet.

The structure of the conductive sheet 40 will be explained with reference to FIG. 3. The conductive sheet 40 includes a first conductive layer 41 and a second conductive layer 42. The shapes of the first conductive layer 41 and the second conductive layer 42 are each approximately rectangular. The shapes of the first conductive layer 41 and the second conductive layer 42 are approximately the same as the shape of the touch panel 19 (refer to FIG. 1). The first conductive layer 41 and the second conductive layer 42 are stacked. The first conductive layer 41 is disposed on the top face side of the touch panel 19 in relation to the second conductive layer 42. A plurality of spacers 45 (refer to FIG. 4) are provided between the first conductive layer 41 and the second conductive layer 42. The spacers 45 keep the first conductive layer 41 and the second conductive layer 42 separated.

The first conductive layer 41 includes a plurality of resistance films 411. The resistance films 411 are transparent. The shape of each of the resistance films 411 is approximately rectangular, and the length of the long side of each of the resistance films 411 is the same as the length of the short side of the first conductive layer 41. The length of the short side of each of the resistance films 411 is shorter than the length of the long side of the first conductive layer 41 and is substantially greater than the diameter of the tip of the writing instrument 2 (refer to FIG. 1). The direction in which the resistance films 411 are arrayed is parallel to the long side of the first conductive layer 41. Gaps 413 are provided in the boundary regions between the adjacent resistance films 411. The space that is occupied by each of the gaps 413 is extremely small in comparison to the length of the short side of each of the resistance films 411. Hereinafter, the direction in which the resistance films 411 are arrayed (the up-down direction in FIG. 3) will be referred to as the Y axis direction. The direction that is orthogonal to the Y axis direction (the left-right direction in FIG. 3) will be referred to as the X axis direction. The Y axis direction corresponds to the direction of the long side of the first conductive layer 41 and the direction of the short sides of the resistance films 411. The X axis direction corresponds to the direction of the short side of the first conductive layer 41 and the direction of the long sides of the resistance films 411. Electrodes 412 are provided at both ends in the X axis direction of each of the resistance films 411. The voltage application portion 38 and the voltage detection portion 39 (refer to FIG. 2) are connected to the electrodes 412. The voltage application portion 38 may apply voltages to the resistance films 411 through the electrodes 412. The voltage detection portion 39 may detect the voltages between the electrodes 412.

The second conductive layer 42 includes a plurality of resistance films 421. The resistance films 421 are transparent. The shape of each of the resistance films 421 is approximately rectangular, and the length of the long side of each of the resistance films 421 is the same as the length of the long side of the second conductive layer 42. The length of the short side of each of the resistance films 421 is shorter than the length of the short side of the second conductive layer 42 and is substantially greater than the diameter of the tip of the writing instrument 2. The Y axis direction corresponds to the direction of the long sides of the second conductive layer 42 and the resistance films 421. The X axis direction corresponds to the direction of the short sides of the second conductive layer 42 and the resistance films 421. The direction in which the resistance films 421 are arrayed is parallel to the short side of the second conductive layer 42, that is, is the X axis direction. Gaps 423 are provided in the boundary regions between the adjacent resistance films 421. The space that is occupied by each of the gaps 423 is extremely small in comparison to the length of the short side of each of the resistance films 421. Electrodes 422 are provided at both ends in the Y axis direction of each of the resistance films 421. The voltage application portion 38 and the voltage detection portion 39 (refer to FIG. 2) are connected to the electrodes 422. The voltage application portion 38 may apply voltages to the resistance films 421 through the electrodes 422. The voltage detection portion 39 may detect the voltages between the electrodes 422.

Hereinafter, the regions where the resistance films 411 of the first conductive layer 41 and the resistance films 421 of the second conductive layer 42 intersect will be referred to as cells. The cells are formed by using a plurality of straight lines that extend in the X axis direction and the Y axis direction to divide the touch panel 19 into a plurality of regions.

The touch panel 19 includes one of the pressure sensors 51 in each of the cells. The pressure sensor 51 is configured to detect the pressure at which the conductive sheet 40 is pressed. Hereinafter, the pressure at which the conductive sheet 40 is pressed will be referred to as the pressing force. The pressure sensors 51 are piezoresistance-type semiconductor pressure sensors. Note that the present disclosure may also use pressure sensors 51 that operate by a different operating method.

Figure 4:
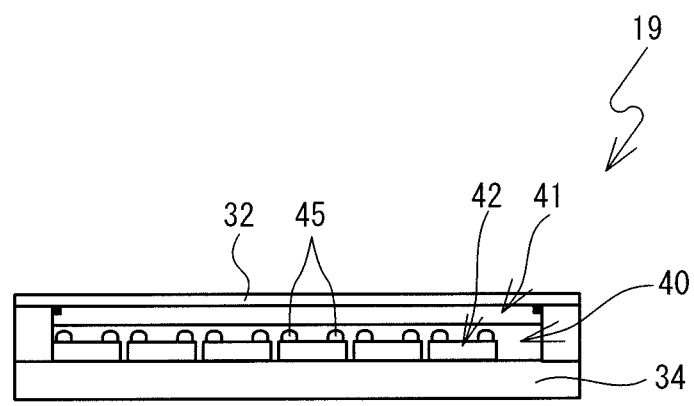
FIG. 4 is a section view as seen from the direction of arrows on a line IV-IV in FIG. 3.

As shown in FIG. 4, a film 32 is overlaid on the first conductive layer 41 of the conductive sheet 40, on the opposite face of the first conductive layer 41 from the side that is closer to the second conductive layer 42. In other words, the film 32 is overlaid on the first conductive layer 41 on the top face of the touch panel 19 (refer to FIG. 1). The film 32 protects the conductive sheet 40. The plurality of spacers 45 are provided between the first conductive layer 41 and the second conductive layer 42. The spacers 45 keep the first conductive layer 41 and the second conductive layer 42 separated. A glass substrate 34 underlies the second conductive layer 42 on the opposite face of the second conductive layer 42 from the side that is closer to the first conductive layer 41. The glass substrate 34 supports the conductive sheet 40.

Figure 5:
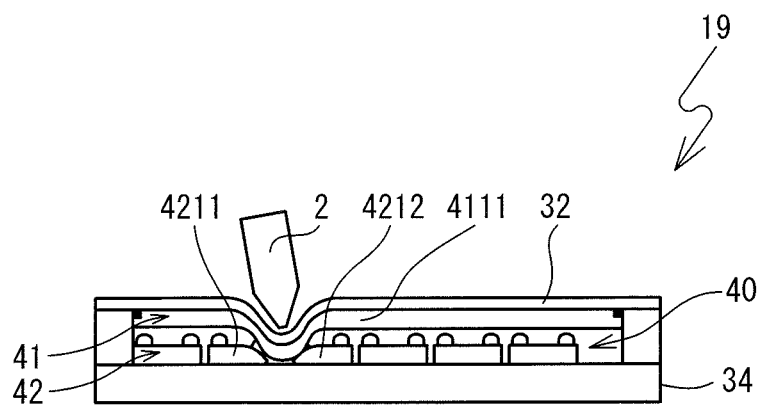
FIG. 5 is a figure that shows a state in which a pressing force is being applied to a touch panel.

The state of the touch panel 19 in a case where the pressing force is applied to the touch panel 19 will be explained with reference to FIG. 5. The top side and the bottom side in FIG. 5 correspond to the top side and the bottom side of the touch panel 19. An example will be explained in which the paper medium 70 (refer to FIG. 1) is placed on the receptacle portion 4 of the electronic writing device 20 (refer to FIG. 1) and writing on the paper medium 70 is performed using the writing instrument 2. The tip of the writing instrument 2 presses on the touch panel 19, which is provided on the bottom face of the receptacle portion 4. As shown in FIG. 5, the touch panel 19 undergoes deformation in accordance with the pressing by the writing instrument 2. The process will now be described in concrete terms. A force is applied to the conductive sheet 40 in a downward direction from the side where the film 32 is provided. The film 32 and the first conductive layer 41 are deflected downward. A resistance film 4111 of the first conductive layer 41 comes into contact with resistance films 4211, 4212 of the second conductive layer 42.

The voltages from the voltage application portion 38 (refer to FIG. 2) are applied between the electrodes 412 (refer to FIG. 3) provided in the resistance films 411 (refer to FIG. 3) with which the first conductive layer 41 is provided and between the electrodes 422 (refer to FIG. 3) provided in the resistance films 421 (refer to FIG. 3) with which the second conductive layer 42 is provided. The writing operation by the writing instrument 2 is performed on the touch panel 19 in the state in which the voltages are being applied between the electrodes 412 and between the electrodes 422. The example in which the touch panel 19 is deformed as shown in FIG. 5 will be used. The voltages between the electrodes 412 that are provided in the resistance film 4111 and the voltages between the electrodes 422 that are provided in the resistance films 4211, 4212 vary according to the contact between the resistance film 4111 of the first conductive layer 41 and the resistance films 4211, 4212 of the second conductive layer 42. The voltage detection portion 39, which is connected to the electrodes 412, 422, detects the voltages between the electrodes 412 and the voltages between the electrodes 422. By acquiring the voltages detected by the voltage detection portion 39, the CPU 21 (refer to FIG. 2) detects the variations in the voltages between the electrodes 412 and the voltages between the electrodes 422.

The CPU 21 specifies, as the cells that have been pressed, the cells in the area where the resistance film 4111 in which the electrodes 412 whose voltages varied are provided intersects the resistance films 4211, 4212 in which the electrodes 422 whose voltages varied are provided. The electrodes 412, 422 are respectively provided in the resistance films 411, 421 that make up the cells, so in a case where a plurality of points on the touch panel 19 are pressed at the same time, the CPU 21 is able to specify simultaneously the plurality of cells that have been pressed. Hereinafter, the cells that have been pressed will be referred to as the pressed cells. Through the pressure sensors 51, the CPU 21 is also able to specify, for each of the pressed cells, the force (hereinafter referred to as the pressing force) applied to the pressed cell.

Based on the voltages between the electrodes that are detected by the voltage detection portion 39, the CPU 21 is able to specify coordinate information that indicates the pressed positions within each of the pressed cells. In a case where a plurality of points on the touch panel 19 are pressed at the same time, the CPU 21 is able to specify simultaneously the coordinate information that indicates the pressed positions in each of the pressed cells, in the same manner as the CPU 21 specifies the plurality of pressed cells. Hereinafter, the coordinate information that indicates the pressed position will be referred to as the cell coordinates. In a case where the touch panel 19 is pressed, the CPU 21 specifies the cell coordinates, the pressed cell that includes the cell coordinates, and the pressing force applied to the pressed cell.

Figure 6:
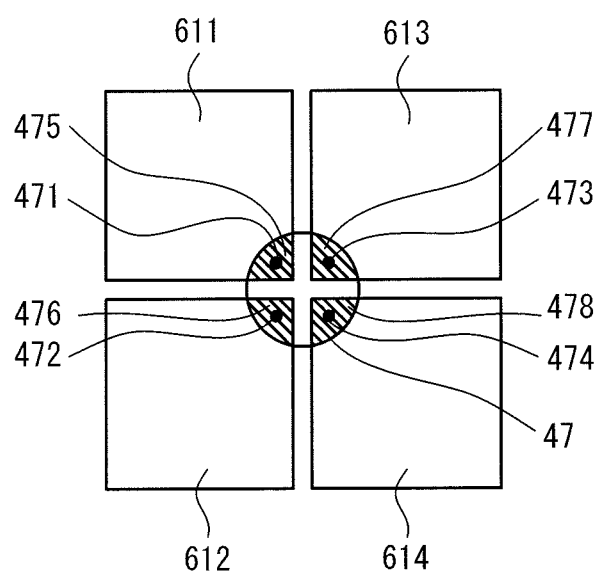
FIG. 6 is a figure that shows cell coordinates that are specified in a case where an area has been pressed.

A case in which a region 47 that includes boundary regions of four cells 611 to 614 that are disposed adjacent to one another has been pressed by the writing instrument 2, as shown in FIG. 6, will be used as an example. In FIG. 6, the upper left cell is the cell 611, the lower left cell is the cell 612, the upper right cell is the cell 613, and the lower right cell is the cell 614. In other words, the region 47 is a region that includes the area where the lower right part of the cell 611, the upper right part of the cell 612, the lower left part of the cell 613, and the upper left part of the cell 614 are close to one another. In this case, the CPU 21 specifies the cells 611 to 614 as the pressed cells. The CPU 21 specifies, as cell coordinates 471 to 474, the coordinates that indicate the positions of the centers of gravity of the areas (shaded areas 475 to 478) where the region 47 overlaps the respective cells 611 to 614.

Hereinafter, the cell coordinates (for example, the cell coordinates 471 to 474) that are specified by the pressing of the touch panel 19 by the writing instrument 2 will be referred to as the writing coordinates. The pressed cells (for example, the cells 611 to 614) that include the writing coordinates will be referred to as the writing cells. As shown in FIG. 6, cases occur in which pluralities of the writing cells and the writing coordinates are specified by the pressing of the touch panel 19 by the writing instrument 2.

Figure 7:
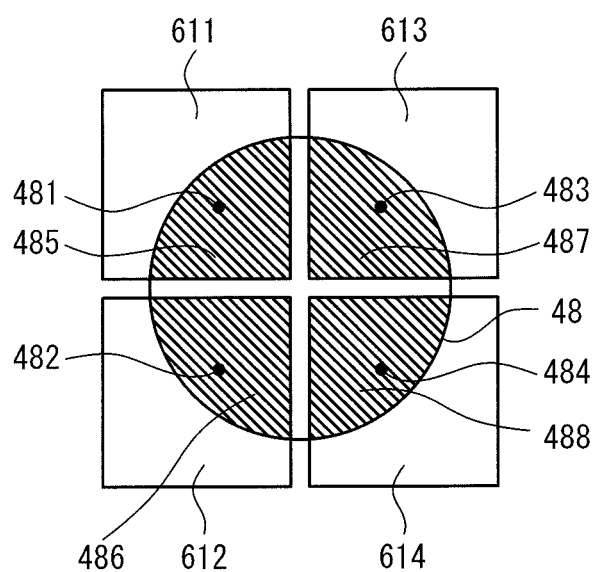
FIG. 7 is a figure that shows cell coordinates that are specified in a case where an area has been pressed.

The example shown in FIG. 7 is an example of a case in which a region 48 that includes boundary regions of the four cells 611 to 614 that are disposed adjacent to one another has been pressed by something other than the writing instrument 2 (for example, the palm of a hand or the like). The region 48 is larger than the region 47 (refer to FIG. 6). In this case, the CPU 21 specifies the cells 611 to 614 as the pressed cells, in the same manner as with the case in FIG. 6. The CPU 21 specifies, as cell coordinates 481 to 484, the coordinates that indicate the positions of the centers of gravity of the areas (shaded areas 485 to 488) where the region 48 overlaps the respective cells 611 to 614. The region 48 is larger than the region 47. Accordingly, the positions of the centers of gravity of the areas 485 to 488 where the region 48 overlaps the respective cells 611 to 614 are closer to the centers of the respective cells 611 to 614. Therefore, the positions that the cell coordinates 481 to 484 indicate are farther apart. Accordingly, the distances between the positions that the cell coordinates 481 to 484 indicate are greater than the distances between the positions that the cell coordinates 471 to 474 indicate (refer to FIG. 6).

In a state in which the touch panel 19 has been pressed, the CPU 21 of the electronic writing device 20 specifies the pressed cells, the cell coordinates, and the pressing forces applied to the pressed cells cyclically at specified time intervals (for example, 10 milliseconds). The CPU 21 outputs to the PC 10 a notification signal that provides notification that the touch panel 19 is pressed. In a case where the CPU 11 of the PC 10 detected the notification signal that was output from the electronic writing device 20, the CPU 11 may output to the electronic writing device 20 request signals that request the transmission of the pressed cells, the cell coordinates, and the pressing forces. The PC 10 outputs separate request signals for the pressed cells, the cell coordinates, and the pressing forces. In a case where the CPU 21 of the electronic writing device 20 detected the request signals that were output from the PC 10, the CPU 21 transmits the pressed cells, the cell coordinates, and the pressing forces to the PC 10. For as long as CPU 21 detects the request signals, the CPU 21 transmits the pressed cells, the cell coordinates, and the pressing forces cyclically at specified time intervals. In a case where the CPU 11 of the PC 10 has received the pressed cells, the cell coordinates, and the pressing forces from the electronic writing device 20, the CPU 11 stores the pressed cells, the cell coordinates, and the pressing forces in the pressed cell table 141 (refer to FIG. 8).

The CPU 21 may also output the notification signal to the PC 10 immediately after the touch panel 19 is pressed. After the touch panel 19 is pressed, the CPU 21 may also store the pressed cells, the cell coordinates, and the pressing forces for a specified time period in the RAM 23, then output the notification signal to the PC 10.

FIG. 8 shows an example of the pressed cell table 141. Time information that indicates the time when the pressed cells, the cell coordinates, and the pressing forces were received, the pressed cells, the cell coordinates, the pressing forces, and flag information are stored in the pressed cell table 141 in every cycle. Information (Cell_X, Cell_Y) that indicates the positions in the X axis direction and the Y axis direction of the touch panel 19 is stored as the pressed cell. The cell in the upper left corner in FIG. 3 serves as the reference for the pressed cells (the reference cell (Cell_X, Cell_Y)=(0, 0)). Coordinate information (X, Y) within the cell is stored as the cell coordinates. The point at the lower left corner of each of the cells in FIG. 3 serves as the reference point for the cell coordinates ((X, Y)=(0, 0)). Hereinafter, the pressed cells and the cell coordinates will be respectively expressed in the form of "pressed cell (Cell_X, Cell_Y)" and "cell coordinates (X, Y)".

For example, in the pressed cell table 141, the pressed cells (2, 3), (2, 4), (3, 3), and (3, 4), which were received from the electronic writing device 20 in cycle 0 (time information 0 (seconds)), are respectively shown as the pressed cell (2, 3), the pressed cell (2, 4), the pressed cell (3, 3), and the pressed cell (3, 4). The pressed cell (2, 3) is the cell located two cells to the right in the X axis direction and three cells downward in the Y axis direction from the reference cell in FIG. 3. The pressed cell (2, 4) is the cell located two cells to the right in the X axis direction and four cells downward in the Y axis direction from the reference cell in FIG. 3. The pressed cell (3, 3) is the cell located three cells to the right in the X axis direction and three cells downward in the Y axis direction from the reference cell in FIG. 3. The pressed cell (3, 4) is the cell located three cells to the right in the X axis direction and four cells downward in the Y axis direction from the reference cell in FIG. 3. The cell coordinates (X, Y) (the cell coordinates (254, 2), (254, 254), (2, 2), (2, 254)) indicate the cell coordinates included in the pressed cells (2, 3), (2, 4), (3, 3), and (3, 4), respectively. The pressing force detected for the pressed cell by the pressure sensor 51 is stored as the pressing force. The flag information will be described later.

A case in which the user holds the writing instrument 2 (refer to FIG. 1) in one hand and performs a writing operation on the touch panel 19 (refer to FIG. 1) will be used as an example. As shown in FIG. 3, the user ordinarily performs the writing operation with the writing instrument 2 while stabilizing a hand 60 by placing the palm of the hand 60 or the like on the touch panel 19. In this case, not only the writing instrument 2, but also the fingers, palm, wrist, arm, and the like of the user's hand 60 press on the touch panel 19. Therefore, in order to specify the writing by the writing instrument 2, it is necessary for the CPU 11 of the PC 10 to recognize, among all of the cell coordinates acquired from the electronic writing device 20, the writing coordinates, which are the cell coordinates where the touch panel 19 pressed by the writing instrument 2, and to distinguish between the writing coordinates and the cell coordinates where the touch panel 19 pressed by something other than the writing instrument 2. The CPU 11 recognizes and distinguishes the writing coordinates by performing main processing (refer to FIG. 9), which will be described later. Based on the recognized writing coordinates, the CPU 11 makes a final setting of the coordinate information that indicates the positions on the touch panel 19 designated by the pressing of the writing instrument 2 on the touch panel 19. Hereinafter, the coordinate information that indicates the positions on the touch panel 19 designated by the user's pressing of the writing instrument 2 on the touch panel 19 will be referred to as the designation coordinates.

The main processing performed by the CPU 11 will be explained with reference to FIG. 9. In a case where the power supply to the PC 10 is turned on, the main processing is started by the CPU 11. The CPU 11 executes a program stored in the HDD 14. In a state in which the touch panel 19 is pressed, the CPU 21 of the electronic writing device 20 specifies the pressed cells, the cell coordinates, and the pressing forces cyclically at 10-millisecond intervals. The CPU 21 outputs the notification signal to the PC 10.

Figure 9:
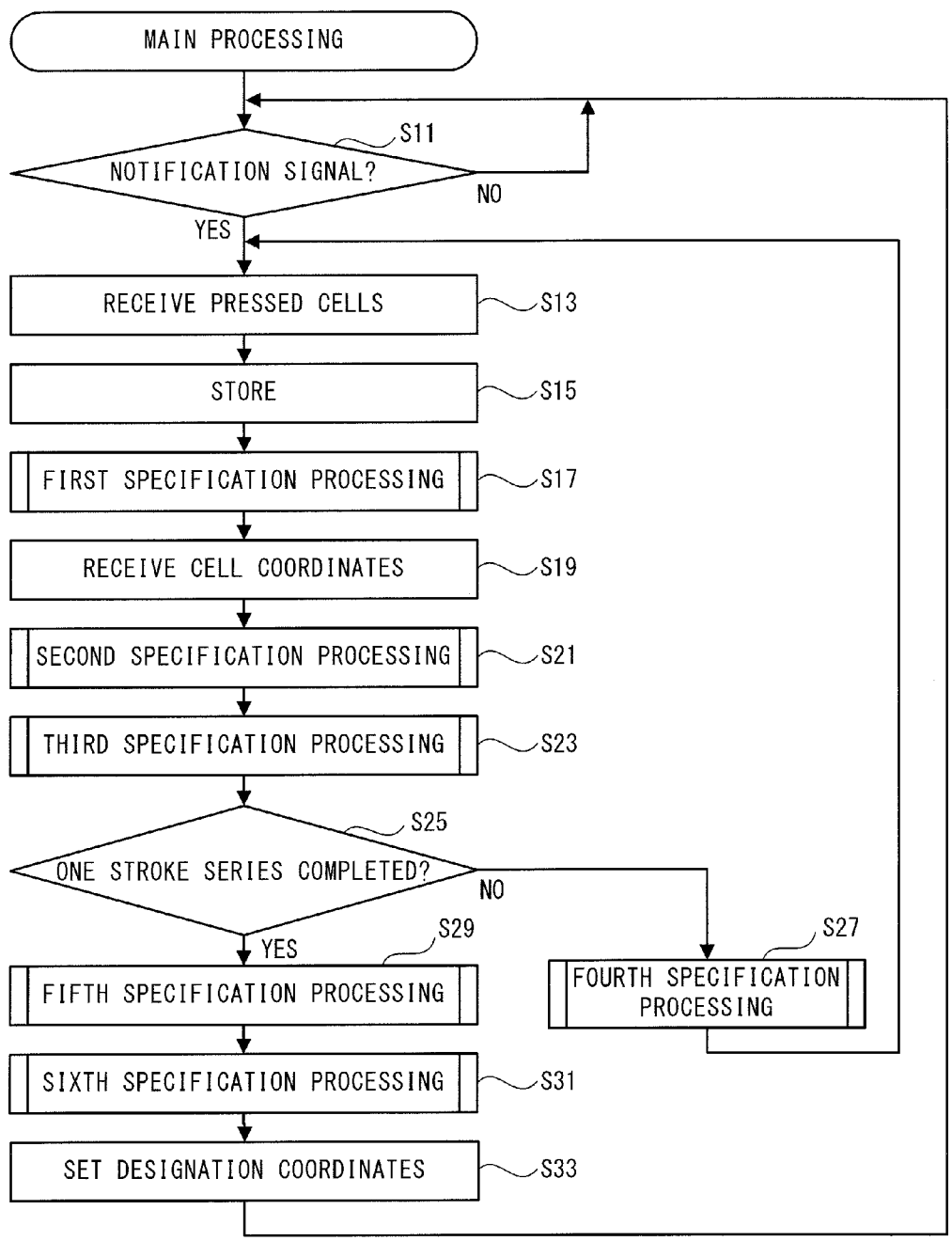
FIG. 9 is a flowchart of main processing.

As shown in FIG. 9, the CPU 11 determines whether the notification signal has been output from the electronic writing device 20 (Step S11). In a case where the notification signal has not been output from the electronic writing device 20 (NO at Step S11), the processing returns to Step S11. In that case, the touch panel 19 is deemed not to have been pressed. In a case where the notification signal has been output from the electronic writing device 20 (YES at Step S11), the touch panel 19 is deemed to have been pressed. The CPU 11 outputs the request signal for the pressed cells to the electronic writing device 20. In response to the request signal, the electronic writing device 20 transmits the pressed cells to the PC 10. The CPU 11 receives the pressed cells transmitted from the electronic writing device 20 (Step S13). The CPU 11 stores the received pressed cells in the pressed cell table 141 (refer to FIG. 8) in association with time information that indicates the time that the pressed cells are received (Step S15).

The process by which the CPU 11 stores the time information in the pressed cell table 141 (refer to FIG. 8) in association with the pressed cells that are received from the electronic writing device 20 will now be explained. In a case where the CPU 11 has detected the first notification signal after a period of time that is longer than 10 milliseconds has elapsed without the notification signal being output from the electronic writing device 20, the CPU 11 stores the time information 0 in the pressed cell table 141 in association with the received pressed cells, starting from the first line in the pressed cell table 141, as shown in FIG. 8. In some cases, the electronic writing device 20 specifies a plurality of pressed cells at the same time. In the example shown in FIG. 8, a plurality of pressed cells are associated with the same time information (the same cycle). Thereafter, for as long as the CPU 11 continues receiving the pressed cells in 10-millisecond cycles, the CPU 11 updates the time information by adding 10 milliseconds to the time information, then stores the updated time information in the pressed cell table 141 in association with the pressed cells. Note that the cell coordinates and the pressing forces have not been received at this point. Therefore, the cell coordinates and the pressing forces are not stored in the pressed cell table 141 in FIG. 8.

As shown in FIG. 9, the CPU 11 performs first specification processing (refer to FIG. 10) (Step S17). In the first specification processing, candidates for the pressed cells that will ultimately be specified as the writing cells are identified from among the pressed cells stored in the pressed cell table 141. Hereinafter, the candidates for the pressed cells that will ultimately be specified as the writing cells will be referred to as the writing cell candidates. The first specification processing will be explained with reference to FIG. 10. A case in which the writing cell candidates are identified from among the pressed cells will be explained in concrete terms, using as an example a case in which the pressed cells (the shaded areas) at the positions shown in FIG. 11 are received in the cycle 0. The positions of the pressed cells shown in FIG. 11 correspond to the positions of the pressed cells in FIG. 3, which shows the case in which the writing operation is performed by the writing instrument 2 (refer to FIG. 3) held by the hand 60 (refer to FIG. 3).

The pressed cells (2, 3), (2, 4), (3, 3), and (3, 4) are pressed by the writing instrument 2. The writing instrument 2 presses the boundary regions of the cells 611 to 614 (refer to FIG. 6, for example). Therefore, the four cells, the cells 611 to 614, are specified as the pressed cells. The pressed cells (6, 3), (6, 4), (7, 3), and (7, 4) are pressed by the knuckle of the index finger of the hand 60. The pressed cells (8, 12), (8, 13), (8, 14), (8, 15), (9, 12), (9, 13), (9, 14), (9, 15), (10, 12), (10, 13), (10, 14), and (10, 15) are pressed by the palm of the hand 60. The pressed cells (9, 19), (9, 20), (10, 19), and (10, 20) are pressed by the arm. The pressed cells (6, 18) and (6, 19) are pressed by the wrist.

Figure 10:
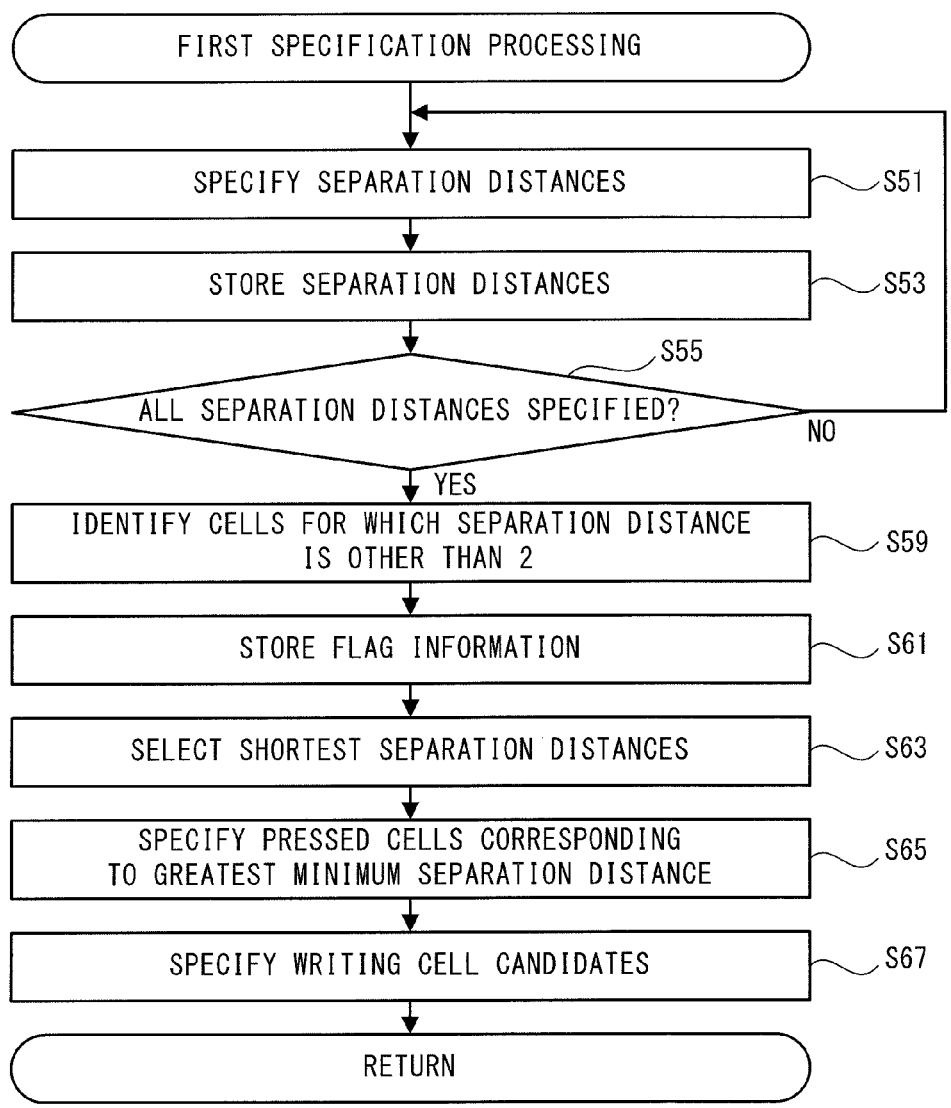
FIG. 10 is a flowchart of first specification processing.
Figure 11:
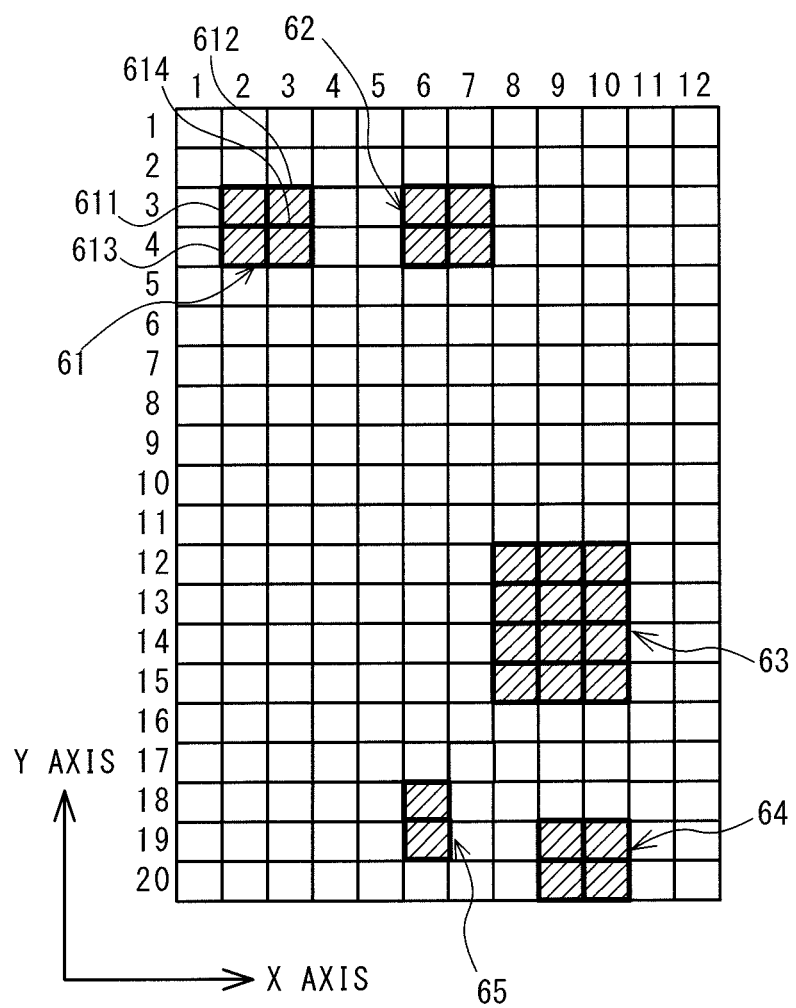
FIG. 11 is a figure that shows an arrangement of adjacent groups.

As shown in FIG. 10, the CPU 11 specifies an extent of separation between two of the pressed cells for every possible pair of the pressed cells (2, 3), (2, 4), (3, 3), (3, 4), (6, 3), (6, 4), (7, 3), (7, 4), (8, 12), (8, 13), (8, 14), (8, 15), (9, 12), (9, 13), (9, 14), (9, 15), (10, 12), (10, 13), (10, 14), (10, 15), (9, 19), (9, 20), (10, 19), (10, 20), (6, 18), and (6, 19) (Step S51). The CPU 11 specifies the extents of separation by applying the separation template 142 (refer to FIG. 12) to the positional relationship of each pair of the pressed cells.

Figure 12:
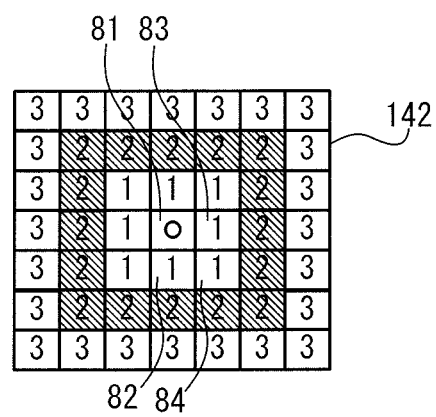
FIG. 12 is a figure that shows a separation template.

The method for specifying the extent of separation by applying the separation template 142 will be explained with reference to FIG. 12. In the separation template 142, numerical values (1, 2, and the like) that indicate extents of separation are arrayed in the vertical direction and the horizontal direction. A plurality of "1" are arrayed such that the plurality of "1" surround a center position (the position indicated by the O in FIG. 12), a plurality of "2" are arrayed such that the plurality of "2" surround the area of the "1," and a plurality of "3" are arrayed such that the plurality of "3" surround the area of the "2." Note that values that are greater than "3" are also arrayed in order, although the values greater than "3" are not shown in FIG. 12. Each of the numerical values indicates an extent of separation from the center position. Hereinafter, the extents of separation indicated by the numerical values will be referred to as the separation distances. The arrangement of the numerical values in the separation template 142 is adjusted such that the greater of the X axis direction distance and the Y axis direction distance between the pair of the pressed cells (expressed in units of one cell) will be specified as the separation distance.

The CPU 11 specifies the positional relationship of the pair of the pressed cells based on the separation template 142. In a case where one of the pair of the pressed cells is located in the center position in the separation template 142, the CPU 11 specifies as the separation distance for the pair of the pressed cells the numerical value that corresponds to the position of the other one of the pair of the pressed cells. For example, the positional relationship of the pressed cell (2, 4) to the pressed cell (2, 3), the positional relationship of the pressed cell (3, 3) to the pressed cell (2, 3), and the positional relationship of the pressed cell (3, 4) to the pressed cell (2, 3) respectively correspond, in the separation template 142, to a value 81 (O) and a value 82 (the separation distance 1), the value 81 (O) and a value 83 (the separation distance 1), and the value 81 (O) and a value 84 (the separation distance 1). Therefore, the separation distances of the pressed cells (2, 4), (3, 3), and (3, 4) in relation to the pressed cell (2, 3) are each 1. Thus the CPU 11 is able to easily specify the extents of separation between the pairs of the pressed cells by specifying the separation distances based on the separation template 142.

Figure 13:
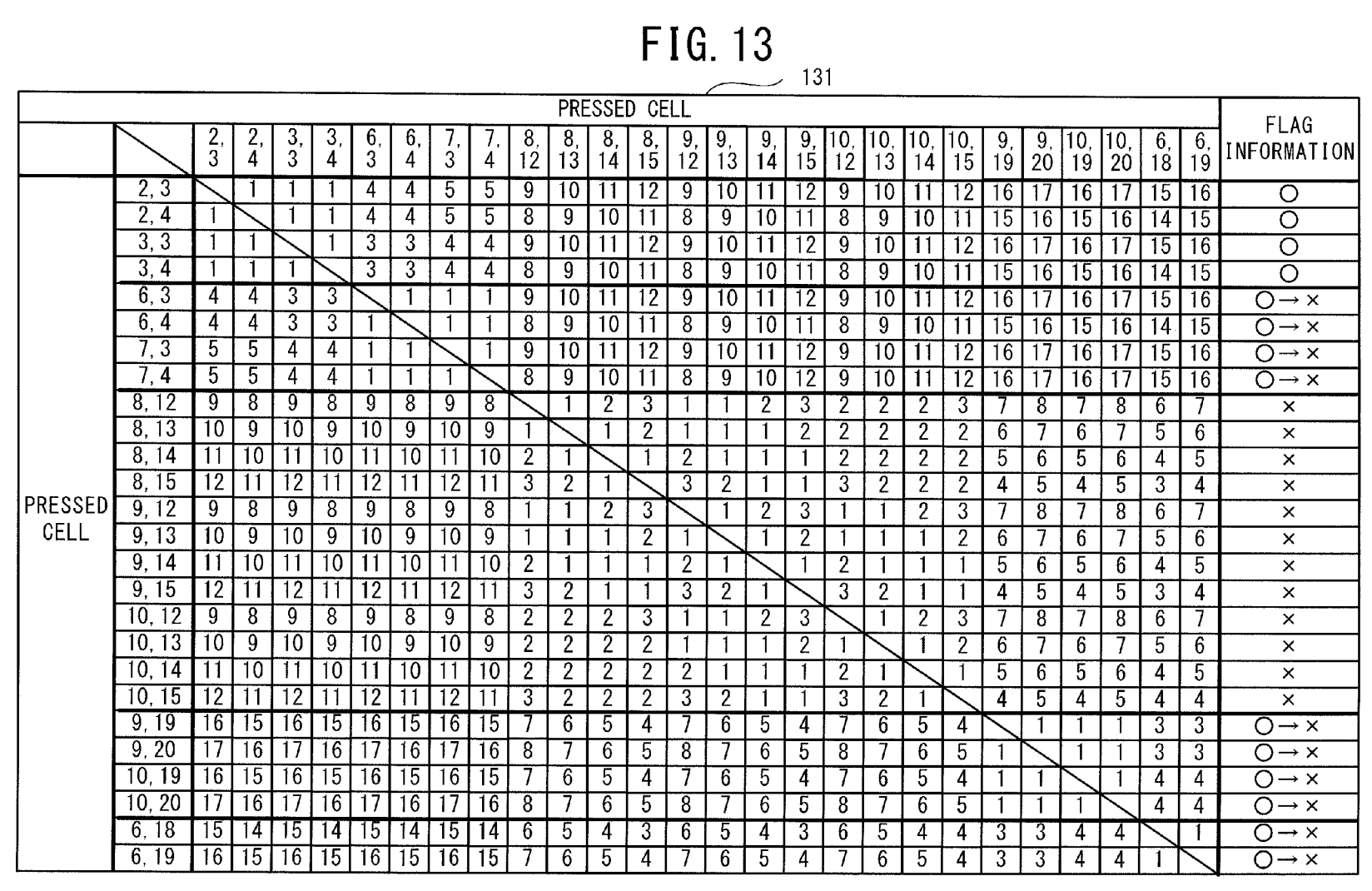

As shown in FIG. 10, the CPU 11 stores in the separation table 131 (refer to FIG. 13) the separation distances specified based on the separation template 142 for each one of the possible pairs of the pressed cells (2, 3), (2, 4), (3, 3), (3, 4), (6, 3), (6, 4), (7, 3), (7, 4), (8, 12), (8, 13), (8, 14), (8, 15), (9, 12), (9, 13), (9, 14), (9, 15), (10, 12), (10, 13), (10, 14), (10, 15), (9, 19), (9, 20), (10, 19), (10, 20), (6, 18), and (6, 19) (Step S53). As shown in FIG. 13, in the separation table 131, the pressed cells are shown in the uppermost row and in the leftmost column. The separation distances that correspond to the combinations of the pressed cells in the uppermost row and the pressed cells in the leftmost column are stored in the fields where the columns that correspond to the pressed cells in the uppermost row intersect the rows that correspond to the pressed cells in the leftmost column.

As shown in FIG. 10, the CPU 11 determines whether the separation distances for all of the possible pairs of the pressed cells have been specified based on the separation template 142 (refer to FIG. 12) (Step S55). In a case where a pair of the pressed cells remains for which the separation distance has not been specified (NO at Step S55), the processing returns to Step S51. In a case where the separation distances for all of the possible pairs of the pressed cells have been specified (YES at Step S55), the CPU 11 stores "X" as the flag information that is associated with any of the pressed cells, among the pressed cells stored in the separation table 131 (refer to FIG. 13), with which the numerical value 2 is associated as the separation distance from another of the pressed cells, the flag information "X" indicating that the corresponding pressed cell is not one of the writing cells. The CPU 11 identifies the pressed cells, among the pressed cells stored in the separation table 131, with which the numerical value 2 is not associated as the separation distance from another of the pressed cells (Step S59). For each of the pressed cells identified by the processing at Step S59, the CPU 11 stores "O" as the associated flag information, indicating that the corresponding pressed cell is one of the writing cell candidates (Step S61).

For example, in the case of the separation table 131 in FIG. 13, the numerical value 2 is not associated with the pressed cells (2, 3), (2, 4), (3, 3), (3, 4), (6, 3), (6, 4), (7, 3), (7, 4), (9, 19), (9, 20), (10, 19), (10, 20), (6, 18), and (6, 19) as the separation distance from another of the pressed cells. The numerical value 2 is associated with the pressed cells (8, 12), (8, 13), (8, 14), (8, 15), (9, 12), (9, 13), (9, 14), (9, 15), (10, 12), (10, 13), (10, 14), and (10, 15) as the separation distance from another of the pressed cells. Therefore, the CPU 11 stores "O" as the flag information that is associated with the pressed cells (2, 3), (2, 4), (3, 3), (3, 4), (6, 3), (6, 4), (7, 3), (7, 4), (9, 19), (9, 20), (10, 19), (10, 20), (6, 18), and (6, 19) shown in the leftmost column of the separation table 131. The CPU 11 stores "X" as the flag information that is associated with the pressed cells (8, 12), (8, 13), (8, 14), (8, 15), (9, 12), (9, 13), (9, 14), (9, 15), (10, 12), (10, 13), (10, 14), and (10, 15) shown in the leftmost column of the separation table 131.

The reason for identifying as the writing cell candidates the pressed cells with which the numerical value 2 is not associated as the separation distance will now be explained. The diameter of the tip of the writing instrument 2 is substantially smaller than one side of one of the cells. In a case where the writing instrument 2 presses on an area where the sides of two of the cells abut one another, the two cells are specified as the pressed cells at the same time. In a case where the writing instrument 2 presses on an area where the corners of four of the cells abut one another, the four cells are specified as the pressed cells at the same time. Therefore, in a case where the touch panel 19 is pressed using the writing instrument 2, the number of the adjacently disposed pressed cells that may possibly be specified at the same time by the CPU 21 of the electronic writing device 20 is one of 1, 2, and 4.

There are many cases in which the palm of the hand 60 or the like is substantially larger than one side of one of the cells. Therefore, in a case where the touch panel 19 is pressed by the palm of the hand 60 or the like during the writing operation by the writing instrument 2, the number of the adjacently disposed pressed cells that may possibly be specified at the same time by the CPU 21 will be greater than 4 in many cases.

In a case where two of the pressed cells are disposed adjacent to one another and the separation distance is specified based on the separation template 142 (refer to FIG. 12), the numerical value 1 is specified as the separation distance from the other pressed cell for each one of the two adjacently disposed pressed cells. In the same manner, in a case where four of the pressed cells are disposed adjacent to one another, the numerical value 1 is specified as the separation distance from the other pressed cell for each one of the four adjacently disposed pressed cells. In a case where more than four of the pressed cells are disposed adjacent to one another, the numerical value 2 is specified as the separation distance from the other pressed cell in many cases. Therefore, identifying as the writing cell candidates the pressed cells with which the numerical value 2 is not associated as the separation distance from the other pressed cell makes it possible to identify the cases where the number of the adjacently disposed pressed cells is one of 2 and 4. The CPU 11 is therefore able to identify the writing cell candidates appropriately. Excluding the pressed cells with which the numerical value 2 is associated as the separation distance from the other pressed cell makes it possible to exclude the cases where the number of the adjacently disposed pressed cells is greater than 4. The CPU 11 is therefore able to exclude from the writing cell candidates the pressed cells pressed by the palm of the hand 60 or the like.

As shown in FIG. 10, after storing the flag information in the separation table 131 (refer to FIG. 13) at Step S61, the CPU 11 refers to the separation table 131 and selects the shortest separation distance for each of the pressed cells identified as the writing cell candidates at Step S59, making the selection from among the separation distances between the writing cell candidates identified at Step S59 and the other pressed cells (Step S63). Hereinafter, the shortest separation distances among the separation distances from the other pressed cells will be referred to as the minimum separation distances. In other words, in the processing at Step S63, the CPU 11 selects the shortest separation distance for each of the pressed cells with which "O" was associated as the flag information at Step S61, making the selection from among the separation distances between the pressed cells with which "O" was associated as the flag information at Step S61 and the other pressed cells. For example, in the case of the separation table 131 in FIG. 13, for the pressed cells (2, 3), (2, 4), (3, 3), (3, 4), (6, 3), (6, 4), (7, 3), (7, 4), (9, 19), (9, 20), (10, 19), (10, 20), (6, 18), and (6, 19), with which "O" is associated as the flag information, the minimum separation distances all have the numerical value 1. Therefore, the CPU 11 selects the numerical value 1 as the minimum separation distance for these pressed cells.

From among the minimum separation distances in the separation table 131 selected at Step S63, the CPU 11 selects the greatest minimum separation distances. The CPU 11 specifies the pressed cells that correspond to the selected minimum separation distances (Step S65). The CPU 11 changes from "O" to "X" the flag information that corresponds to the pressed cells with which "O" is associated as the flag information in the separation table 131, except for the pressed cells specified at Step S65. The CPU 11 also adds "(1st)" to the flag information in the pressed cell table 141 as information indicating that the flag information was changed from "O" to "X" by the first specification processing. Thus the CPU 11 specifies as the writing cell candidates in the separation table 131 only the pressed cells specified at Step S65 (Step S67). In the pressed cell table 141 (refer to FIG. 8), the CPU 11 stores "O" as the flag information that corresponds to the pressed cells with which the flag information "O" is ultimately associated in the separation table 131. The first specification processing is terminated, and the processing returns to the main processing (refer to FIG. 9).

In the case of the separation table 131 in FIG. 13, for the pressed cells (2, 3), (2, 4), (3, 3), (3, 4), (6, 3), (6, 4), (7, 3), (7, 4), (9, 19), (9, 20), (10, 19), (10, 20), (6, 18), and (6, 19) identified at Step S9, the minimum separation distances all have the numerical value 1 (Step S63; refer to FIG. 10). In this case, the CPU 11 is not able to select the greatest minimum separation distances at Step S65. Therefore, the CPU 11 specifies as the writing cell candidates all of the pressed cells for which the minimum separation distances have the numerical value 1 (Step S67; refer to FIG. 10). In the pressed cell table 141 (refer to FIG. 8), the pressed cells (2, 3), (2, 4), (3, 3), (3, 4), (6, 3), (6, 4), (7, 3), (7, 4), (9, 19), (9, 20), (10, 19), (10, 20), (6, 18), and (6, 19) are in a state in which "O" is associated with them as the flag information.

In many cases, the positions of the pressed cells pressed by the writing instrument 2 are separated by sizeable distances from the positions of pressed cells pressed by the palm of the hand 60 or the like that holds the writing instrument 2. For example, in FIG. 3, the positions of the pressed cells (2, 3), (2, 4), (3, 3), and (3, 4) are separated by sizeable distances from the positions of the pressed cells (9, 19), (9, 20), (10, 19), (10, 20), (6, 18), and (6, 19). A case in which only one of the pressed cells is pressed by the writing instrument 2 will be used as an example. In a case where the touch panel 19 is pressed by the palm of the hand 60 or the like, there is a strong possibility that an area that is larger than a single cell is pressed and that a plurality of pressed cells are disposed adjacent to one another. There is also a strong possibility that the minimum separation distances between each one of the plurality of pressed cells and the respective other pressed cells are less than the minimum separation distance between the one pressed cell pressed by the writing instrument 2 and the other pressed cells. Therefore, there is a strong possibility that the minimum separation distance between the pressed cell pressed by the writing instrument 2 and the other pressed cells is greater than the minimum separation distances between each one of the pressed cells pressed by the palm of the hand 60 or the like and the respective other pressed cells. Therefore, at Step S65, the CPU 11 identifies as the writing cell candidate the pressed cell that corresponds to the greatest minimum separation distance among the minimum separation distances selected at Step S63. Thus the CPU 11 is able to specify the writing cell candidate easily.

As described above, in the first specification processing, the pressed cells possibly pressed by the writing instrument 2 are recognized and distinguished from the pressed cells pressed by something other than the writing instrument 2 by the selecting of the writing cell candidates based on the separation distances. In the first specification processing, based on the separation distances, the writing cell candidates are identified among the plurality of pressed cells that were acquired from the electronic writing device 20. The first specification processing limits the number of the pressed cells that are eligible for the processing that ultimately sets the designation coordinates. The processing burden on the CPU 11, which will perform second specification processing to sixth specification processing, which will be described later, is therefore reduced.

As shown in FIG. 9, after the first specification processing (Step S17) has been terminated, the CPU 11 outputs the request signal for the cell coordinates to the electronic writing device 20. The requested cell coordinates are the cell coordinates that indicate the positions within the pressed cells with which "O" is associated as the flag information in the pressed cell table 141 (refer to FIG. 8). The pressed cells with which "O" is associated as the flag information in the pressed cell table 141 (refer to FIG. 8) are the pressed cells that are the writing cell candidates at this time, that is, the pressed cells (2, 3), (2, 4), (3, 3), (3, 4), (6, 3), (6, 4), (7, 3), (7, 4), (9, 19), (9, 20), (10, 19), (10, 20), (6, 18), and (6, 19). The electronic writing device 20 transmits the cell coordinates in response to the request signal. The CPU 11 receives the cell coordinates transmitted from the electronic writing device 20 (Step S19). The CPU 11 stores the received cell coordinates in the pressed cell table 141 (refer to FIG. 8) in association with the corresponding pressed cells. The received cell coordinates correspond to the writing cell candidates. Hereinafter, the received cell coordinates will be referred to as the writing coordinate candidates. The CPU 11 performs the second specification processing (refer to FIG. 14) (Step S21).

The second specification processing will be explained with reference to FIG. 14. The CPU 11 divides the pressed cells (2, 3), (2, 4), (3, 3), (3, 4), (6, 3), (6, 4), (7, 3), (7, 4), (9, 19), (9, 20), (10, 19), (10, 20), (6, 18), and (6, 19) identified by the first specification processing (Step S17; refer to FIG. 9) into groups of the pressed cells that are disposed adjacent to one another. Specifically, the CPU 11 divides the pressed cells into a group of the adjacently disposed pressed cells (2, 3), (2, 4), (3, 3), and (3, 4), a group of the adjacently disposed pressed cells (6, 3), (6, 4), (7, 3), and (7, 4), a group of the adjacently disposed pressed cells (9, 19), (9, 20), (10, 19), and (10, 20), and a group of the adjacently disposed pressed cells (6, 18) and (6, 19). Hereinafter, the groups of the adjacently disposed pressed cells will be referred to as the adjacency groups. The group of the adjacently disposed pressed cells (2, 3), (2, 4), (3, 3), and (3, 4) will be referred to as the adjacency group 61. The group of the adjacently disposed pressed cells (6, 3), (6, 4), (7, 3), and (7, 4) will be referred to as the adjacency group 62. The group of the adjacently disposed pressed cells (9, 19), (9, 20), (10, 19), and (10, 20) will be referred to as the adjacency group 64. The group of the adjacently disposed pressed cells (6, 18) and (6, 19) will be referred to as the adjacency group 65. Note that the group of the adjacently disposed pressed cells (8, 12), (8, 13), (8, 14), (8, 15), (9, 12), (9, 13), (9, 14), (9, 15), (10, 12), (10, 13), (10, 14), and (10, 15) will be referred to as the adjacency group 63, although at this time, the cells have already been excluded from being specified as the writing cells.

Figure 15:
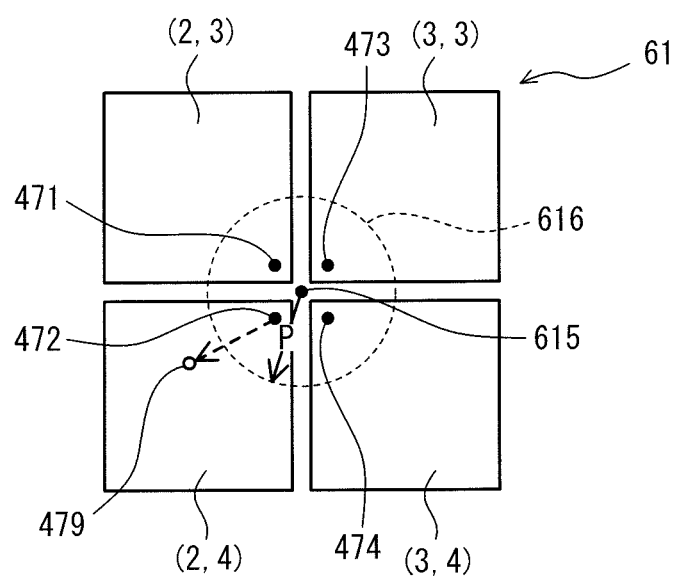
FIG. 15 is a figure that shows an effective range.

The CPU 11 selects one of the adjacency groups. A case in which the adjacency group 61 is selected will be used as an example. The CPU 11 specifies an effective range as hereinafter explained. As shown in FIG. 15, the CPU 11 defines a boundary point (hereinafter, referred to as the first reference point) 615 for the adjacency group 61 (the pressed cells (2, 3), (2, 4), (3, 3), and (3, 4)). The boundary point for the adjacency group 61 (the pressed cells (2, 3), (2, 4), (3, 3), and (3, 4)) is a point in the boundary region at the lower right of the pressed cell (2, 3), at the upper right of the pressed cell (2, 4), at the lower left of the pressed cell (3, 3), and at the upper left of the pressed cell (3, 4). The CPU 11 defines, as an effective range 616, the area within a circle with a radius of P that has the center at the first reference point 615. The length of the radius P is set to a reference threshold value, which is a specified threshold value. For example, the reference threshold value may be set to approximately three-fourths of the length of one side of one of the cells.

Figure 14:
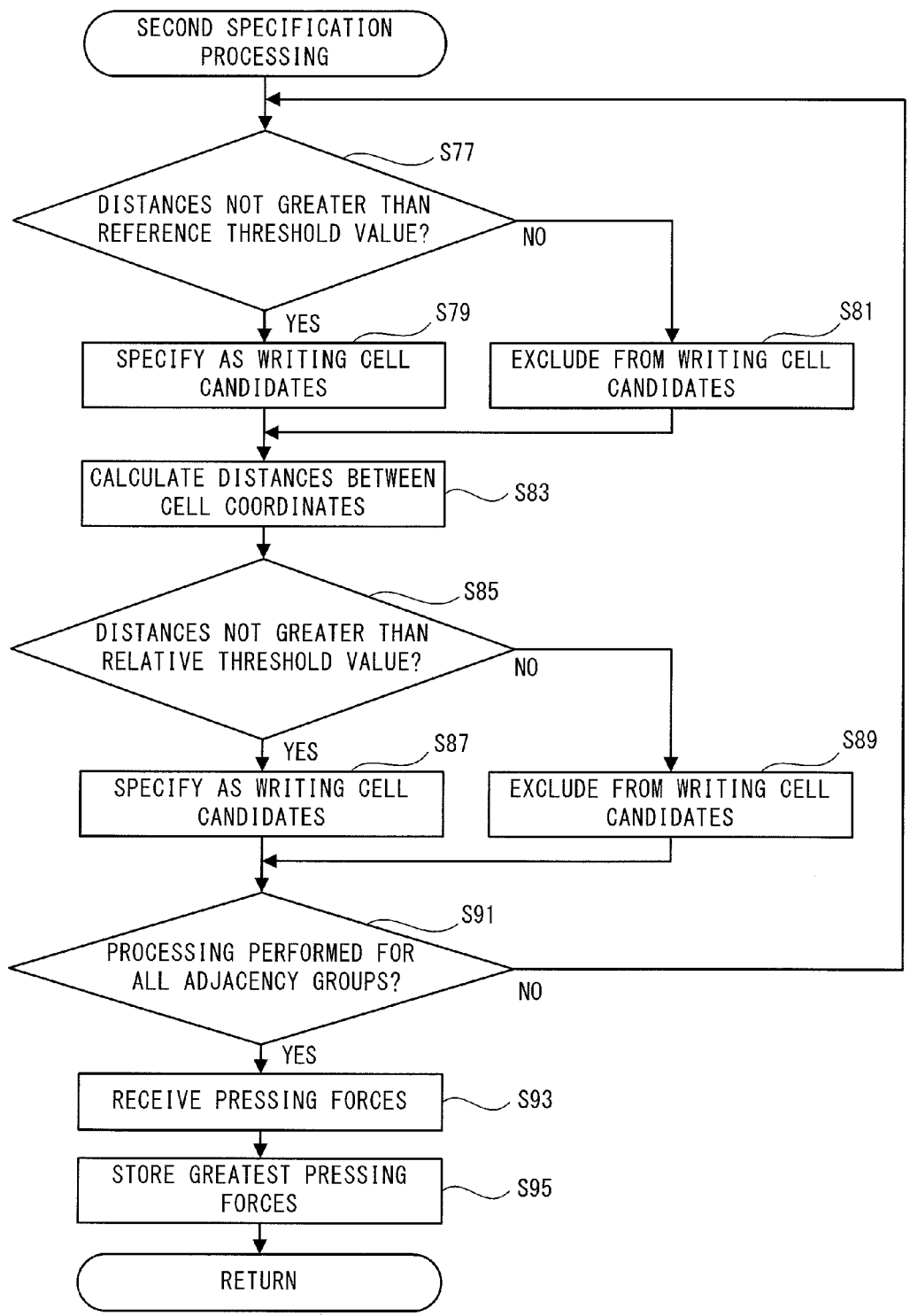
FIG. 14 is a flowchart of second specification processing.

As shown in FIG. 14, the CPU 11 determines whether the distances between the first reference point 615 and the cell coordinates for each of the cells within the adjacency group 61 are not greater than the reference threshold value (Step S77). In other words, at Step S77, the CPU 11 determines whether the cell coordinates 471 (the cell coordinates (254, 2)), the cell coordinates 472 (the cell coordinates (254, 254)), the cell coordinates 473 (the cell coordinates (2, 2)), and the cell coordinates 474 (the cell coordinates (2, 254)) are located within the effective range 616. In a case where the distances between the first reference point 615 and the cell coordinates for each of the cells are not greater than the reference threshold value (YES at Step S77), the CPU 11 specifies as the writing cell candidates the pressed cells that include the applicable cell coordinates (Step S79). The processing advances to Step S83. In a case where the distances between the first reference point 615 and the cell coordinates for each of the cells are greater than the reference threshold value (NO at Step S77), the CPU 11 excludes from the writing cell candidates the pressed cells that include the applicable cell coordinates (Step S81). Specifically, in the pressed cell table 141 (refer to FIG. 8), the CPU 11 changes from "O" to "X" the flag information that corresponds to the cell coordinates for which the distances from the first reference point 615 are greater than the reference threshold value. As the flag information in the pressed cell table 141, the CPU 11 also adds "(2nd)" to the flag information as information that indicates that the flag information was changed from "O" to "X" by the second specification processing. Thus the CPU 11 excludes from the writing cell candidates the pressed cells that include the cell coordinates for which the distances from the first reference point 615 are greater than the reference threshold value.

In FIG. 15, the cell coordinates 471 to 474 are all disposed within the effective range 616. Therefore, the pressed cells (2, 3), (2, 4), (3, 3), and (3, 4) that include the cell coordinates 471 to 474 are not excluded from the writing cell candidates. A case in which, due to the effects of noise or the like during the specification of the cell coordinates by the electronic writing device 20, the cell coordinates 472 are coordinates that specify the position of a point 479 that is outside of the effective range 616 will be used as an example. In this case, the CPU 11 changes the flag information in the pressed cell table 141 that corresponds to the cell coordinates 472 from "O" to "X" and adds "(2nd)" to the flag information. Thus the CPU 11 excludes from the writing cell candidates the pressed cell (2, 4) that includes the cell coordinates 472.

The reason for excluding from the writing cell candidates the pressed cells that include the cell coordinates that are outside of the effective range 616 will now be explained. In a case where the touch panel 19 is pressed using the writing instrument 2, and a plurality of pressed cells that are adjacent to one another are specified by the electronic writing device 20, the writing instrument 2 is deemed to have pressed a boundary region among the pressed cells. Therefore, there is a strong possibility that the cell coordinates included within the specified pressed cells are disposed in the vicinity of the boundary region. In contrast, in a case where the touch panel 19 is pressed by the palm of the hand 60 or the like of the user (refer to FIG. 7, for example), as well as in a case where the electronic writing device 20 specifies the cell coordinates incorrectly due to the effects of noise or the like during the specification of the cell coordinates, there is a strong possibility that the cell coordinates are disposed outside of the effective range 616. Therefore, in the pressed cell table 141 (refer to FIG. 8), the CPU 11 changes from "O" to "X" the flag information that corresponds to the pressed cells that include the cell coordinates disposed outside of the effective range 616, thus excluding from the writing cell candidates the pressed cells that include the cell coordinates that are disposed outside of the effective range 616.

Figure 17:
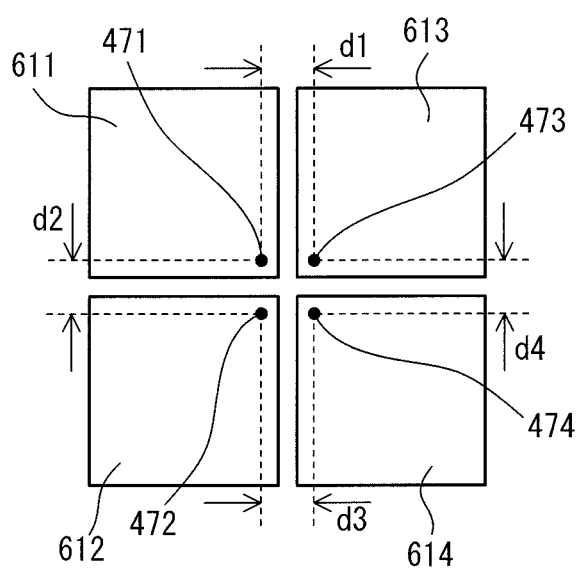
FIG. 17 is a figure that shows distances between cell coordinates.

As shown in FIG. 14, the CPU 11 calculates the distances between individual pairs of the cell coordinates 471 to 474 (refer to FIG. 17). A case in which a distance d1 between the cell coordinates 471, 473, a distance d2 between the cell coordinates 471, 471, a distance d3 between the cell coordinates 472, 474, and a distance d4 between the cell coordinates 473, 474 are calculated as shown in FIG. 17 will be used as a specific example. As shown in FIG. 14, the CPU 11 determines whether each of the calculated distances d1 to d4 between the cell coordinates is not greater than a relative threshold value, which is a specified threshold value (Step S85). In a case where all of the distances d1 to d4 between the cell coordinates are not greater than the relative threshold value (YES at Step S85), the CPU 11 specifies as the writing cell candidates the pressed cells (2, 3), (2, 4), (3, 3), and (3, 4) that respectively include the cell coordinates 471 to 474 (Step S87). The processing advances to Step S91.

In a case where all of the distances d1 to d4 between the cell coordinates are greater than the relative threshold value (NO at Step S85), the CPU 11 changes from "O" to "X" the flag information in the pressed cell table 141 (refer to FIG. 8) that corresponds to the pressed cells (2, 3), (2, 4), (3, 3), and (3, 4) that respectively include the cell coordinates 471 to 474 and adds "(2nd)" to the flag information. Thus the CPU 11 excludes the pressed cells from the writing cell candidates. The processing advances to Step S91.

A case will be explained in which the distances d1 to d3 are not greater than the relative threshold value, but the distance d4 is greater than the relative threshold value. In this case, one of the pair of the cell coordinates 473, 474 for calculating the distance d4 (refer to FIG. 17) is included in the pair of the cell coordinates 471, 473 for calculating the distance d1 and in the pair of the cell coordinates 472, 474 for calculating the distance d3, both of which are not greater than the relative threshold value. Therefore, in the pressed cell table 141, the CPU 11 does not change to "X" the flag information that corresponds to the pressed cells (3, 3) and (3, 4) that include the cell coordinates 473, 474 (YES at Step S85; Step S87). Thus, even in a case where the distance calculated based on a given pair of the cell coordinates is greater than the relative threshold value, the CPU 11 does not exclude from the writing cell candidates the pressed cells that include the cell coordinates that make up that pair, if one of the sets of the cell coordinates in that pair is included in a different pair of the cell coordinates for which the calculated the distance is not greater than the relative threshold value.

As shown in FIG. 14, the CPU 11 determines whether the processing at Steps S77 to S89 has been performed for each one of the adjacency groups 61, 62, 64, 65 (Step S91). In a case where the processing has not been performed for all of the adjacency groups (NO at Step S91), the processing returns to Step S77.

Figure 16:
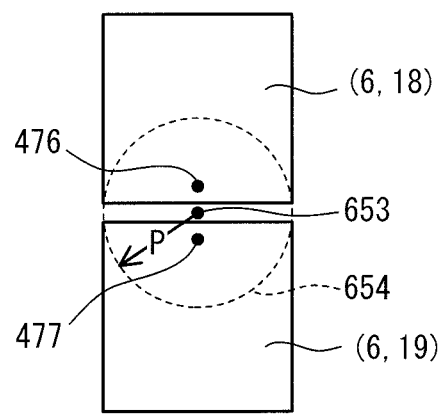
FIG. 16 is a figure that shows an effective range.

A case in which the adjacency group 65 is selected and the processing at Steps S77 to S91 is performed will be used as an example. The pressed cells (6, 18) and (6, 19) are disposed such that the bottom side of the pressed cell (6, 18) is close to the top side of the pressed cell (6, 19). The CPU 11 specifies the effective range as hereinafter described. The CPU 11 defines as a first reference point 653 a point in a central portion of the adjacent sides of the adjacency group 65 (the pressed cells (6, 18) and (6, 19)), as shown in FIG. 16. The CPU 11 defines, as an effective range 654, the area within a circle of the radius P that has the center at the first reference point 653. The CPU 11 specifies, from among cell coordinates 476 and 477, the cell coordinates located inside the defined effective range 654 (YES at Step S77), then specifies as the writing cell candidates the pressed cells that include the specified cell coordinates (Step S79). In contrast, the CPU 11 specifies the cell coordinates that are located outside of the effective range 654 (NO at Step S77), then changes from "O" to "X" the flag information in the pressed cell table 141 (refer to FIG. 8) that corresponds to the pressed cells that include the specified cell coordinates, adding "2nd" to the flag information. The CPU 11 thus excludes from the writing cell candidates the pressed cells that include the cell coordinates located outside of the effective range 654 (Step S81; refer to FIG. 14).

The CPU 11 calculates the distance between the cell coordinates 476 and 477 (Step S83). In a case where the calculated distance is not greater than the relative threshold value (YES at Step S85), the CPU 11 does not change to "X" the flag information in the pressed cell table 141 that corresponds to the pressed cells (6, 18) and (6, 19), which include the cell coordinates 476 and 477 (Step S87). In a case where the calculated distance is greater than the relative threshold value (NO at Step S85), the CPU 11 changes from "O" to "X" the flag information in the pressed cell table 141 that corresponds to the pressed cells (6, 18) and (6, 19), which include the cell coordinates 476 and 477, adding "2nd" to the flag information (Step S89).

As shown in FIG. 14, in a case where the processing has been performed for each one of the adjacency groups 61, 62, 64, 65 (YES at Step S91), the processing advances to Step S93. A case in which the adjacency groups 61, 62, 64, 65 are not excluded from the writing cell candidates by the processing at Steps S77 to S89 will now be used as an example. The CPU 11 outputs the request signal for the pressing forces to the electronic writing device 20. The pressed cells for which the CPU 11 requests the pressing forces are the pressed cells with which "O" is associated as the flag information in the pressed cell table 141 (refer to FIG. 8). The CPU 21 of the electronic writing device 20 transmits to the PC 10 the pressing forces acquired through the pressure sensors 51 (refer to FIG. 2) in the individual pressed cells. The CPU 11 receives the pressing forces transmitted from the electronic writing device 20 (Step S93). The CPU 11 stores the received pressing forces in the pressed cell table 141 (refer to FIG. 8) in association with the pressed cells.

The CPU 11 compares the pressing forces within each of the adjacency groups 61, 62, 64, 65. For each of the adjacency groups 61, 62, 64, 65, the CPU 11 specifies the pressed cell associated with the greatest pressing force within the adjacency group. The CPU 11 stores the specified pressed cells and the associated pressing forces in the pressing force table 132 (refer to FIG. 18) in association with the corresponding adjacency groups (Step S95). The second specification processing is terminated, and the processing returns to the main processing (FIG. 9).

FIG. 18 shows the pressing force table 132. In the pressing force table 132, the adjacency group, the pressed cell, and the pressing force are stored in association with one another. The pressed cell associated with the adjacency group indicates the pressed cell pressed with the greatest pressing force among all of the pressed cells in the adjacency group.

As described previously, in the electronic writing device 20, cases occur in which the position that the user has designated by using the writing instrument 2 to press on the touch panel 19 straddles a plurality of cells. In those cases, the electronic writing device 20 detects a plurality of pressed cells that are adjacent to one another. It is therefore difficult to distinguish between a plurality of pressed cells designated using the writing instrument 2 and a plurality of pressed cells detected in a case where the user has pressed the touch panel 19 with the palm of the hand 60 or the like.

The positional relationships among the plurality of cell coordinates included in a plurality of pressed cells detected by the electronic writing device 20 exhibit different tendencies in a case where the user has used the writing instrument 2 to press the touch panel 19 from a case in which the user has pressed the touch panel 19 with the palm of the hand 60 or the like. Specifically, in a case where the touch panel 19 is pressed by the writing instrument 2, the cell coordinates are close to the first reference point. In a case where the touch panel 19 is pressed by the palm of the hand 60 or the like, the cell coordinates are relatively distant from the first reference point. The PC 10 determines whether the cell coordinates are valid, based on the positional relationships among the cell coordinates included in the plurality of pressed cells. In this manner, the PC 10 recognizes and distinguishes between a position that the user has designated by using the writing instrument 2 to press on the touch panel 19 and a position pressed by the palm of the hand 60 or the like, such that the PC 10 is able to specify the designation coordinates.

Specifically, in the second specification processing, in a case where the distance from the first reference point 615, which is set on the boundary between the cells, to a position indicated by the cell coordinates is not greater than the reference threshold value, the CPU 11 determines that the position that the cell coordinates indicate has been pressed by the writing instrument 2. In a case where the distance from the first reference point 615 to a position indicated by the cell coordinates is greater than the reference threshold value, the CPU 11 determines that the position that the cell coordinates indicate has not been pressed by the writing instrument 2. In a case where the distances between the cell coordinates included in the pressed cells are not greater than the relative threshold value, the CPU 11 determines that the position that the cell coordinates indicate has been pressed by the writing instrument 2. In a case where the distances between the cell coordinates are greater than the relative threshold value, the CPU 11 determines that the position that the cell coordinates indicate has not been pressed by the writing instrument 2. The reason for these determinations is that, in a case where a plurality of cells have been pressed by the writing instrument 2 at the same time, the pressed area is positioned close to the boundary between the cells, so the cell coordinates that are specified within the cells also indicate positions that are close to the boundary. By determining as described above, the CPU 11 is able to specify the writing cell candidates appropriately.

As shown in FIG. 9, after the second specification processing (refer to Step S21) has been terminated, the CPU 11 performs the third specification processing (refer to FIG. 19) (Step S23). The third specification processing will be explained with reference to FIG. 19. The CPU 11 selects one of the pressing forces stored in the pressing force table 132 (refer to FIG. 18). The CPU 11 determines whether the selected pressing force is not greater than a pressing force threshold value, which is a specified threshold value (Step S101). In a case where the selected pressing force is not greater than the pressing force threshold value (YES at Step S101), the CPU 11 specifies as the writing cell candidates all of the pressed cells within the adjacency group that corresponds to the selected pressing force (Step S102). The processing advances to Step S104.

In a case where the selected pressing force is greater than the pressing force threshold value (NO at Step S101), the CPU 11 specifies the adjacency group in the pressing force table 132 that corresponds to the pressing force that is greater than the pressing force threshold value. In the pressed cell table 141 (refer to FIG. 8), the CPU 11 specifies all of the pressed cells within the specified adjacency group. In the pressed cell table 141 (refer to FIG. 8), the CPU 11 changes from "O" to "X" the flag information that corresponds to the specified pressed cells. The CPU 11 also adds "(3rd)" to the flag information as information that indicates that the flag information was changed from "O" to "X" by the third specification processing. In this manner, the CPU 11 excludes from the writing cell candidates all of the pressed cells included in the adjacency group that includes the pressed cell with the large pressing force (Step S103). The processing advances to Step S104.

At Step S103, the reason for excluding from the writing cell candidates all of the pressed cells included in the adjacency group that includes the pressed cell associated with the pressing force that is greater than the pressing force threshold value will now be explained. In many cases, the pressing force when the writing instrument 2 is used to press on the touch panel 19 is not greater than a specified magnitude (the pressing force threshold value). In a case where the pressing force is greater than the pressing force threshold value, the pressing force is too great. Therefore, there is a strong possibility that the touch panel 19 has not been pressed by the writing instrument 2. Therefore, the CPU 11 excludes from the writing cell candidates the pressed cell associated with the pressing force that is greater than the pressing force threshold value. There is also deemed to be a strong possibility that the other pressed cells included in the adjacency group that includes the excluded pressed cell have not been pressed by the writing instrument 2. Therefore, the CPU 11 excludes from the writing cell candidates the other pressed cells included in the adjacency group. In a case where the pressing force selected from the pressing force table 132 (refer to FIG. 18) is not greater than the pressing force threshold value, the pressing forces for all of the pressed cells within the adjacency group that includes the pressed cell associated with the selected pressing force are deemed to be not greater than the pressing force threshold value. In this case, there is a strong possibility that the adjacency group has been pressed by the writing instrument 2. The CPU 11 specifies all of the pressed cells as the writing cell candidates.

From among the adjacency groups that include the pressed cells with which "O" is associated as the flag information in the pressed cell table 141 (refer to FIG. 8), the CPU 11 specifies the adjacency groups whose positions on the touch panel 19 are disposed relatively toward the upper side (Step S105). The CPU 11 changes from "O" to "X" the flag information that is associated with all of the pressed cells included in the adjacency groups other than the specified adjacency groups. The CPU 11 also adds "(3rd)" to the flag information as information that indicates that the flag information was changed from "O" to "X" by the third specification processing. In this manner, the CPU 11 excludes from the writing cell candidates all of the pressed cells included in the adjacency groups that are disposed relatively toward the lower side of the touch panel 19 (Step S109). The third specification processing is terminated, and the processing returns to the main processing (refer to FIG. 9).

This will be explained using a specific example. The example that will be used is a case in which "O" has been stored in the pressed cell table 141 (refer to FIG. 8) as the flag information associated with the pressed cells included in the adjacency groups 61, 62, 64, 65 shown in FIG. 11. Note that the pressed cells included in the adjacency group 63 have been excluded from the writing cell candidates in the first specification processing (refer to FIG. 10). In this case, the adjacency groups 61, 62 are disposed toward the upper side in relation to the adjacency groups 64, 65, so the CPU 11 specifies the adjacency groups 61, 62 (Step S105). In the pressed cell table 141, the CPU 11 changes from "O" to "X", and adds "(3rd)" to, the flag information that is associated with all of the pressed cells included in the adjacency groups 64, 65, excluding the adjacency groups 61, 62. Thus the CPU 11 excludes from the writing cell candidates the pressed cells included in the adjacency groups 64, 65 (Step S109).

The specific method for specifying the adjacency groups disposed relatively toward the upper side will now be explained. For each of the adjacency groups, the CPU 11 specifies the pressed cells with which "O" is associated as the flag information, among the pressed cells included in the adjacency group. From among the specified pressed cells, the CPU 11 identifies the pressed cells disposed the farthest toward the lower side within each of the adjacency groups, then compares the pressed cells identified in each of the adjacency groups. Based on the result of the comparing, the CPU 11 specifies, as the adjacency groups that are disposed relatively toward the upper side, the adjacency groups that include the pressed cells disposed the farthest toward the upper side.

The reason for excluding from the writing cell candidates all of the pressed cells except the pressed cells included in the adjacency groups whose positions on the touch panel 19 are disposed relatively toward the upper side will now be explained. In a case where the writing instrument 2 is used to perform the writing operation on the touch panel 19, in many cases the writing instrument 2 is disposed to the upper side in relation to the hand 60. Therefore, the possibility is strong that the pressed cells located on the upper side in relation to the other pressed cells are pressed by the writing instrument 2. There is little possibility that the pressed cells located on the lower side in relation to the other pressed cells are pressed by the writing instrument 2.

In the case in FIG. 11, the adjacency groups 61, 62 are relatively toward the upper side in comparison to the adjacency groups 63 to 65. Therefore, there is a strong possibility that the pressed cells included in the adjacency groups 61, 62 are pressed by the writing instrument 2, and there is little possibility that the pressed cells included in the adjacency groups 63 to 65 are pressed by the writing instrument 2. Therefore, in the pressed cell table 141 (refer to FIG. 8), the CPU 11 changes from "O" to "X", and adds "(3rd)" to, the flag information that corresponds to the pressed cells (the pressed cells (9, 19), (9, 20), (10, 19), (10, 20), (6, 18), and (6, 19)) included in the adjacency groups 64, 65. In this manner, the pressed cells included in the adjacency groups 64, 65 are excluded from the writing cell candidates.

As described above, in the third specification processing, in a case where the pressing forces that correspond to all of the plurality of pressed cells within the adjacency group are not greater than the pressing force threshold value, the CPU 11 specifies that the pressed cells within the adjacency group are cells that have been pressed by the writing instrument 2. The reason for this is that in a case where the touch panel 19 has been pressed by the writing instrument 2, there is a strong possibility that the pressing force is not greater than the pressing force threshold value. The CPU 11 is thus able to specify more appropriately the position pressed by the writing instrument 2.

As shown in FIG. 9, after the third specification processing (Step S23) has been terminated, the CPU 11 determines whether the writing operation for one stroke series has been completed (Step S25). One stroke series describes a series of successive line segments from start to finish. In a case where a state in which the notification signal is not output from the electronic writing device 20 has continued for not less than 10 milliseconds, the CPU 11 determines that the user of the electronic writing device 20 has completed a single series of writing operations on the touch panel 19. The single series of writing operations is equivalent to the writing operation for one stroke series on the electronic writing device 20. The writing operation for one stroke series may be, for example, a writing operation for a single character string or a writing operation for a single character.

In a case where the notification signal is being continuously output from the electronic writing device 20, the CPU 11 determines that the writing operation for one stroke series has not been completed and is continuing (NO at Step S25). In a case where the notification signal is being continuously output, the CPU 11 performs the fourth specification processing (refer to FIG. 21) (Step S27). The fourth specification processing will be described in detail below. After the fourth specification processing has been terminated, the processing returns to Step S13 in order to acquire the pressed cells, the cell coordinates, and the pressing forces from the electronic writing device 20 in the next cycle and perform the first specification processing to the third specification processing. In contrast, in a case where a state in which the notification signal is not output from the electronic writing device 20 has continued for not less than 10 milliseconds, the CPU 11 determines that the writing operation for one stroke series has been completed (YES at Step S25). In a case where a state in which the notification signal is not output from the electronic writing device 20 has continued for not less than 10 milliseconds, the CPU 11 performs the fifth specification processing (refer to FIG. 23) (Step S29). The fifth specification processing will be described in detail later. The processing advances to Step S31.

Figure 20:
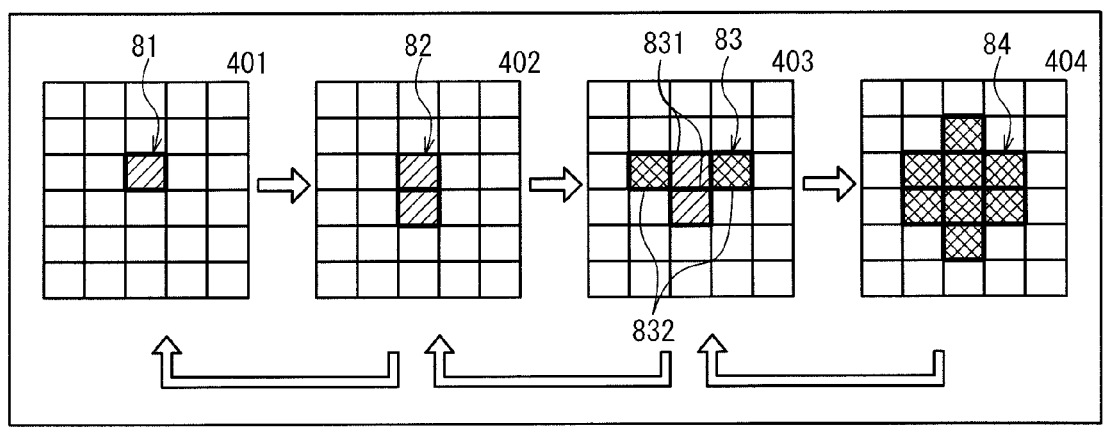
FIG. 20 is an explanatory figure of fourth specification processing.

The fourth specification processing will be explained. In the fourth specification processing, in a case where one of the pressed cells acquired from the electronic writing device 20 in the current cycle is excluded from the writing cell candidates in the first specification processing (refer to FIG. 10), but is located in the same position as one of the pressed cells specified as one of the writing cell candidates in an earlier cycle, the CPU 11 also excludes that pressed cell from the writing cell candidates in the earlier cycle in which the pressed cell was originally specified as one of the writing cell candidates. An overview of the fourth specification processing will be explained with reference to FIG. 20. FIG. 20 shows a pressed cell 81 and pressed cell groups 82 to 84 that are cyclically specified by the electronic writing device 20 in cycles 401 to 404, respectively, as the palm of the hand 60 or the like gradually moves closer to the touch panel 19 and ultimately presses on the touch panel 19. As the palm of the hand 60 or the like moves closer to the touch panel 19, the surface area where the touch panel 19 and the palm of the hand 60 or the like are in contact gradually becomes larger. Therefore, the number of the pressed cells that are specified gradually increases over time.

For example, in the cycle 401, the palm of the hand 60 or the like slightly contacts with the touch panel 19, and the touch panel 19 is pressed by only a part of the palm or the like. Therefore, only the one pressed cell 81 is specified by the electronic writing device 20. In the cycle 402, after 10 milliseconds have elapsed since the cycle 401, the distance between the touch panel 19 and the palm of the hand 60 or the like has become shorter than the distance in the cycle 401. A larger part of the palm of the hand 60 or the like presses on the touch panel 19. Therefore, the two cells in the pressed cell group 82 are specified. In the cycle 403, after 10 milliseconds have elapsed since the cycle 402, the four cells in the pressed cell group 83 are specified, a still larger number than in the pressed cell group 82. In the cycle 404, after 10 milliseconds have elapsed since the cycle 403, the even more numerous eight cells in the pressed cell group 84 are specified.

At Step S59 in the first specification processing (refer to FIG. 10), the CPU 11 stores "X" as the flag information that corresponds to the pressed cells, among the pressed cells stored in the separation table 131 (refer to FIG. 13), with which the numerical value 2 is associated as the separation distance from another of the pressed cells. The CPU 11 thus excludes from the writing cell candidates the pressed cells with which the numerical value 2 is associated as the separation distance. A case in which the first specification processing is performed for the pressed cell group 84 specified in the cycle 404 will be used as an example. More than four of the pressed cells are disposed adjacent to one another in the pressed cell group 84. Therefore, all of the pressed cells in the pressed cell group 84 are excluded from the writing cell candidates by the first specification processing. In contrast, in a case where the first specification processing is performed for the pressed cell group 83 specified in the cycle 403, the numerical value 2 is not associated with the two vertically arrayed cells in a pressed cell group 831 as the separation distance from another of the pressed cells. On the other hand, the separation distance is 2 for each of the two cells in a pressed cell group 832, the two cells being disposed on opposite sides of the pressed cell group 831 within the pressed cell group 83. Therefore, when the first specification processing is performed, the cells of the pressed cell group 832 within the pressed cell group 83 are excluded from the writing cell candidates, and the cells of the pressed cell group 831 are not excluded from the writing cell candidates. When the first specification processing is performed for the pressed cell 81 and the pressed cell group 82 respectively specified in the cycles 401 and 402, the numerical value 2 is not associated with the pressed cell 81 and the cells of the pressed cell group 82 as the separation distance from another of the pressed cells. Therefore, the pressed cell 81 and the cells of the pressed cell group 82 are not excluded from the writing cell candidates by the first specification processing. As described above, the pressed cell 81 acquired in the cycle 401, the cells of the pressed cell group 82 acquired in the cycle 402, and the cells of the pressed cell group 831 acquired in the cycle 403 are not excluded from the writing cell candidates in the first specification processing, even though the pressed cell 81, the cells of the pressed cell group 82, and the cells of the pressed cell group 831 have not been pressed by the writing instrument 2.

The CPU 11 excludes the pressed cell 81, the cells of the pressed cell group 82, and the cells of the pressed cell group 831 from the writing cell candidates as will be described. A case in which the cells of the pressed cell group 84 are acquired from the electronic writing device 20 in the cycle 404 and are excluded from the writing cell candidates by the first specification processing will be used as an example. From among the pressed cell 81 and the cells of the pressed cell groups 82 and 83, which are acquired from the electronic writing device 20 in the cycles 401 to 403, the CPU 11 excludes from the writing cell candidates the pressed cells that are in the same positions as the cells of the pressed cell group 84 excluded from the writing cell candidates. Note that the cells of the pressed cell group 832 were excluded from the writing cell candidates by the first specification processing in an earlier cycle. Therefore, the pressed cell 81 acquired in the cycle 401, the cells of the pressed cell group 82 acquired in the cycle 402, and the cells of the pressed cell group 831 acquired in the cycle 403 are actually excluded from the writing cell candidates. The CPU 11 is thus able to exclude from the writing cell candidates the pressed cells acquired in earlier cycles, but that were not excluded from the writing cell candidates by the first specification processing.

Figure 21:
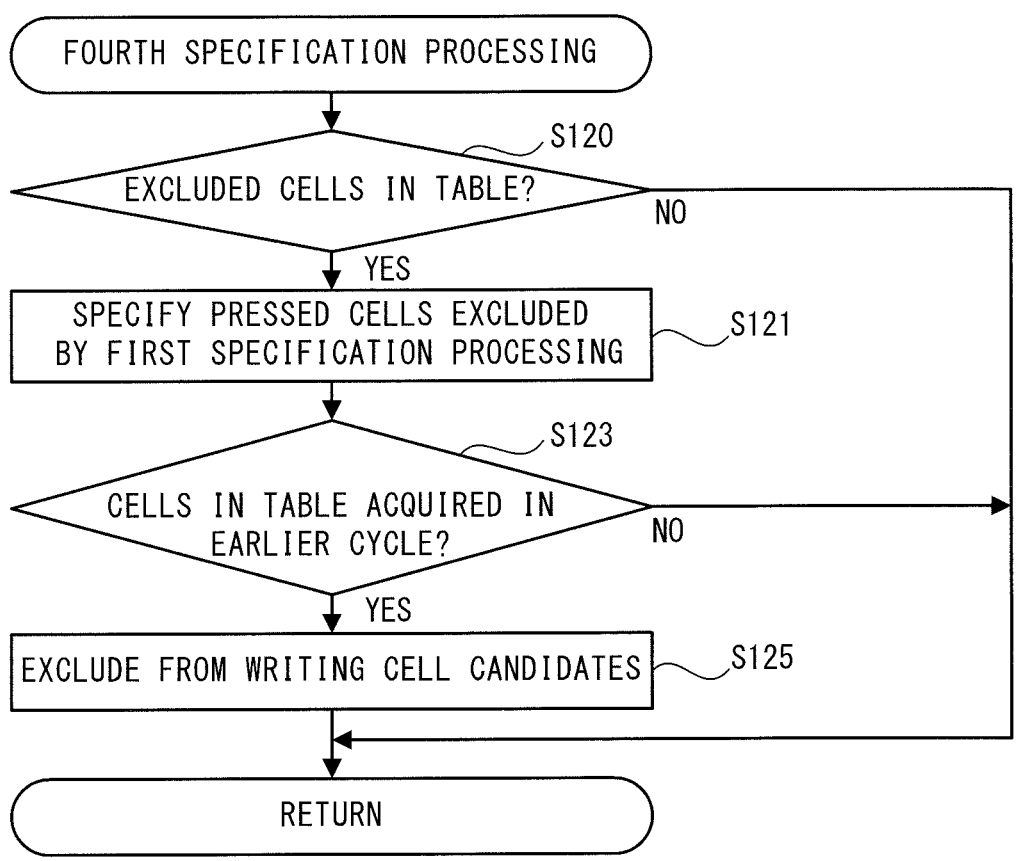
FIG. 21 is a flowchart of the fourth specification processing.

The fourth specification processing will be explained according to the flowchart, with reference to FIG. 21. The CPU 11 determines whether any of the pressed cells stored in the pressed cell table 141 (refer to FIG. 8) are among the pressed cells excluded from the writing cell candidates at Step S59 in the first specification processing (refer to FIG. 10) in the current cycle (Step S120). The pressed cells excluded from the writing cell candidates at Step S59 are specifically the pressed cells with which "X (1st)" is associated as the flag information. In a case where none of the pressed cells is excluded from the writing cell candidates by the first specification processing in the current cycle (NO at Step S120), the fourth specification processing is terminated, and the processing returns to the main processing (refer to FIG. 9).

In a case where there are the pressed cells excluded from the writing cell candidates by the first specification processing in the current cycle (YES at Step S120), the CPU 11 specifies the pressed cells in the pressed cell table 141 with which "X (1st)" is associated as the flag information (Step S121). The pressed cells excluded from the writing cell candidates by the first specification processing are specifically the pressed cells, among the pressed cells stored in the pressed cell table 141, with which "X (1st)" is associated as the flag information. The CPU 11 determines whether the pressed cells acquired from the electronic writing device 20 in an earlier cycle are stored in the pressed cell table 141 (refer to FIG. 8) (Step S123). In a case where the pressed cells acquired in an earlier cycle are stored in the pressed cell table 141 (YES at Step S123), the CPU 11 specifies, from among the pressed cells acquired in an earlier cycle, the pressed cells that are in the same positions as the pressed cells specified at Step S121. The CPU 11 stores "X" as the flag information for the pressed cells that were specified in the pressed cell table 141. The CPU 11 also adds "(4th)" to the flag information as information that indicates that the flag information was changed from "O" to "X" by the fourth specification processing. In this manner, the CPU 11 excludes from the writing cell candidates the pressed cells, among the pressed cells acquired in an earlier cycle, that are in the same positions as the pressed cells specified at Step S121 (Step S125). The fourth specification processing is terminated, and the processing returns to the main processing (refer to FIG. 9). In a case where there are none of the pressed cells acquired from the electronic writing device 20 in an earlier cycle (NO at Step S123), the CPU 11 terminates the fourth specification processing and returns the processing to the main processing (refer to FIG. 9).

As described above, in the fourth specification processing, among the pressed cells acquired in an earlier cycle, the pressed cells that are in the same positions as the pressed cells excluded from the writing cell candidates by the first specification processing in the current cycle can be excluded. By performing the first specification processing in every cycle, the CPU 11 can exclude from the writing cell candidates the pressed cells specified as the writing cell candidates in an earlier cycle, in a case where the pressed cells excluded from the writing cell candidates in the current cycle are in the same positions as the pressed cells specified as the writing cell candidates in an earlier cycle. The CPU 11 is therefore able to specify the writing cell candidates more accurately.

Figure 22:
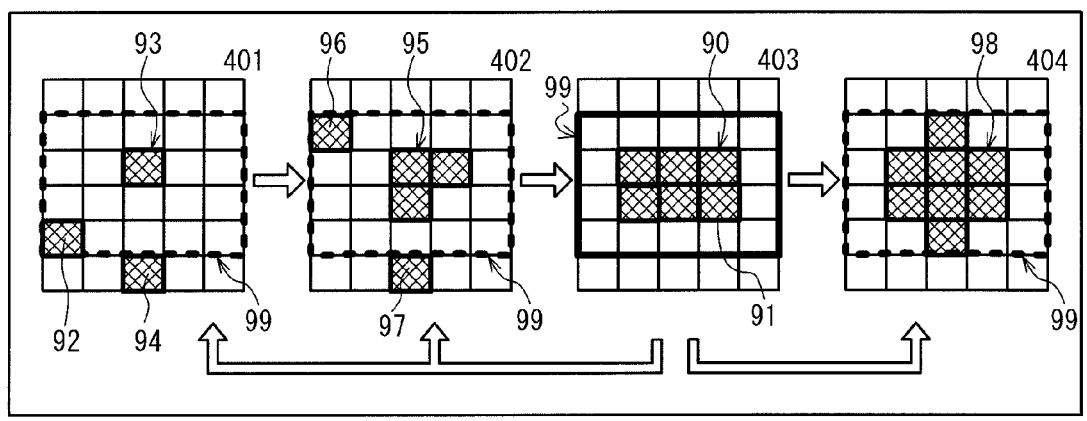
FIG. 22 is an explanatory figure of fifth specification processing.

The fifth specification processing will be explained. In the fifth specification processing, the CPU 11 identifies, among the pressed cells acquired in all of the cycles, the pressed cells that are in the same positions included in an area cell group (described later), then excludes the identified pressed cells from the writing cell candidates. The area cell group will be described in detail later. The area cell group is a group of the cells, among the pressed cells acquired by the electronic writing device 20, that includes the pressed cells excluded from the writing cell candidates at Step S103 of the third specification processing (refer to FIG. 19). An overview of the fifth specification processing will be explained with reference to FIG. 22. In a case where the palm of the hand 60 or the like presses strongly on the touch panel 19, the deflection of the first conductive layer 41 (refer to FIG. 5) becomes greater as the pressing force increases. As the deflection of the first conductive layer 41 (refer to FIG. 5) becomes greater, the surface area where the first conductive layer 41 and the second conductive layer 42 (refer to FIG. 5) are in contact gradually becomes larger. Therefore, the number of the specified pressed cells gradually increases as the pressing force increases. In the case of the example shown in FIG. 22, the number of the specified pressed cells is greater in order from a pressed cell 93 (in the cycle 401), to a pressed cell group 95 (in the cycle 402), to a pressed cell group 90 (in the cycle 403), to a pressed cell group 98 (in the cycle 404).

In a case where the touch panel 19 is pressed by a strong pressing force, the first conductive layer 41 and the second conductive layer 42 do not come into contact in the other pressed cells that are adjacent to the pressed cells pressed by the strong pressing force. However, the space between the first conductive layer 41 and the second conductive layer 42 is smaller than a case in which the pressing force is not applied to the touch panel 19. In the same manner, under the influence of the strong pressing force, the space between the first conductive layer 41 and the second conductive layer 42 is smaller in the cells disposed around the adjacency group that is made up of the pressed cells pressed by the strong pressing force and the other pressed cells that are adjacent to the pressed cells pressed by the strong pressing force. In a case where the space between the first conductive layer 41 and the second conductive layer 42 is small, the cells are in an unstable state, because the first conductive layer 41 and the second conductive layer 42 can easily come into contact, and the cells where the first conductive layer 41 and the second conductive layer 42 come into contact can easily be specified as the pressed cells. Therefore, there is a possibility that the cells where the space between the first conductive layer 41 and the second conductive layer 42 is small are specified as the writing cell candidates. It is therefore desirable to exclude the cells where the space between the first conductive layer 41 and the second conductive layer 42 is small from the writing cell candidates.

The CPU 11 excludes from the writing cell candidates the cells disposed such that the cells encompass the area around the adjacency group that includes the pressed cells pressed by the strong pressing force. After the writing operation for one stroke series is completed, the CPU 11 determines whether an adjacency group that includes a pressed cell where the pressing force is greater than the pressing force threshold value is stored in the pressed cell table 141 (refer to FIG. 8). The pressed cells included in the adjacency group that includes a pressed cell where the pressing force is greater than the pressing force threshold value have been excluded from the writing cell candidates at Step S103 of the third specification processing (refer to FIG. 19). Therefore, "X (3rd)" is stored as the flag information for the applicable pressed cells in the pressed cell table 141. Accordingly, the determination is made that the pressed cell with which "X (3rd)" is associated as the flag information are stored in the pressed cell table 141 (refer to FIG. 8).

A case in which the pressed cells acquired in the cycle 403 form an adjacency group 91 and the pressing force that corresponds to at least one of pressed cells included in the adjacency group 91 is greater than the pressing force threshold value will be used as an example. In this case, all of the cells in a pressed cell group 90 included in the adjacency group 91 have been excluded from the writing cell candidates by the third specification processing (refer to FIG. 19). In the pressed cell table 141 (refer to FIG. 8), "X (3rd)" is associated with all of the cells in the pressed cell group 90 as the flag information.

The CPU 11 specifies a cell group 99 that includes the pressed cell group 90 included in the adjacency group 91, as well as the cells that are disposed such that the cells encompass the area around the adjacency group 91. Hereinafter, the pressed cells included in an adjacency group, together with the group of cells that includes the cells that are disposed such that the cells encompass the area around the adjacency group, will collectively be referred to as the area cell group. From among pressed cells 92 to 94 (in the cycle 401), a pressed cell group 95 and pressed cells 96 and 97 (in the cycle 402), and a pressed cell group 98 (in the cycle 404), all of which are stored in the pressed cell table 141 (refer to FIG. 8), the CPU 11 excludes from the writing cell candidates the pressed cells 92, 93, and 96, as well as the cells in the pressed cell groups 95 and 98, which are located in the same positions as cells in the specified cell group 99. Thus, among all of the pressed cells acquired from the electronic writing device 20, the CPU 11 excludes from the writing cell candidates the pressed cells that are in an unstable state due to the applying of the strong pressing force.

Figure 23:
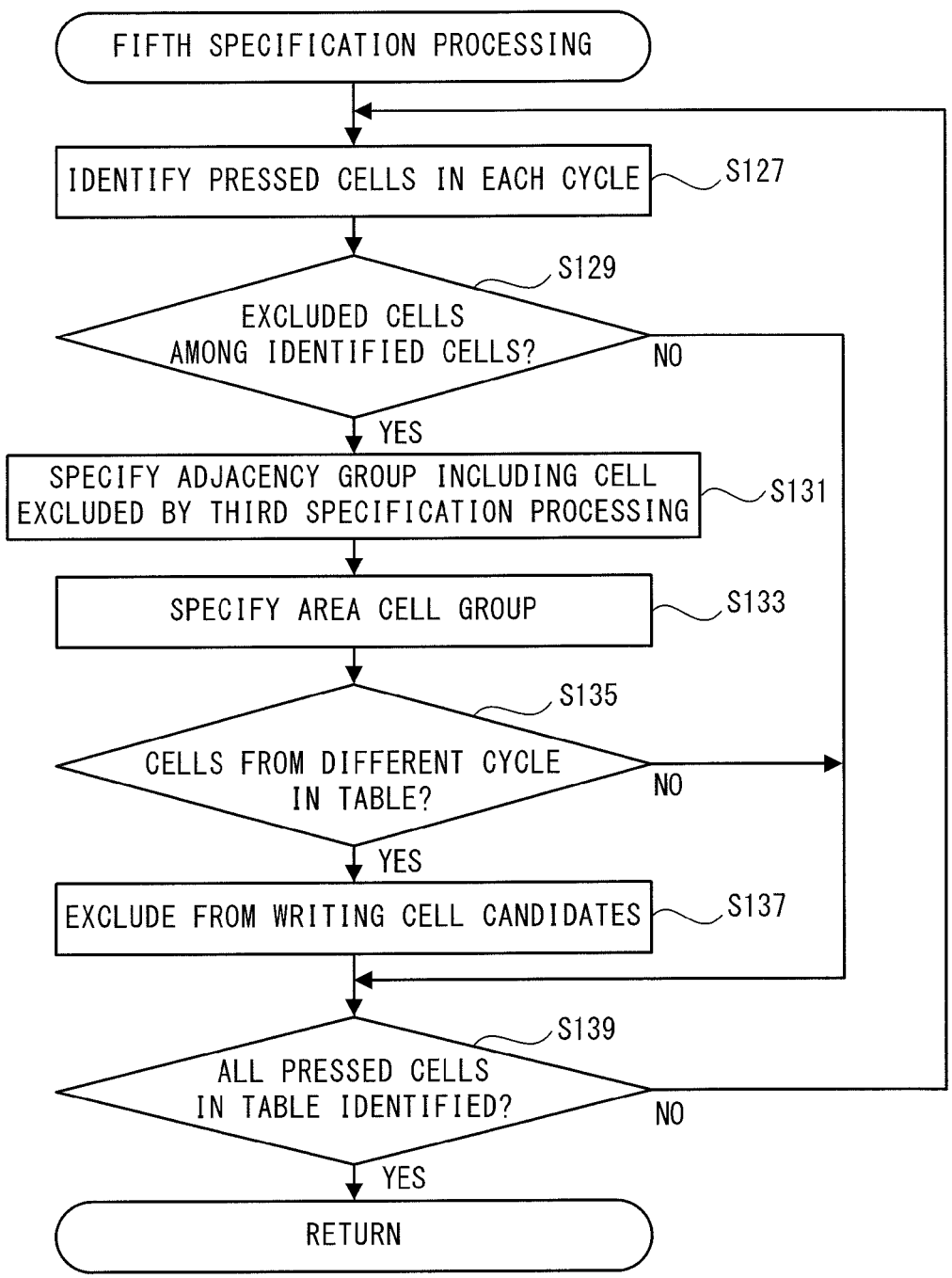
FIG. 23 is a flowchart of the fifth specification processing.

The fifth specification processing will be explained according to the flowchart, with reference to FIG. 23. The CPU 11 identifies the pressed cells stored in the pressed cell table 141 (refer to FIG. 8) for each cycle (Step S127). The CPU 11 determines whether any of the pressed cells excluded from the writing cell candidates at Step S103 of the third specification processing (refer to FIG. 19) are included in the identified pressed cells (Step S129). The pressed cells excluded from the writing cell candidates at Step S103 of the third specification processing are specifically the pressed cells with which "X (3rd)" is associated as the flag information. In a case where none of the pressed cells excluded at Step S103 is included among the identified cells (NO at Step S129), the processing advances to Step S139.

In a case where at least one of the pressed cells excluded from the writing cell candidates by the third specification processing is included among the pressed cells identified at Step S127 (YES at Step S129), the CPU 11 specifies the adjacency group that includes the at least one of the pressed cells excluded from the writing cell candidates by Step S103 of the third specification processing (Step S131). The adjacency group is specified based on a correspondence relationship between the at least one pressed cell and one of the adjacency groups stored in the pressing force table 132 (refer to FIG. 18). The CPU 11 specifies the area cell group as including the pressed cells within the specified adjacency group and the cells that are disposed in the area around the pressed cells within the specified adjacency group (Step S133).

The CPU 11 determines whether at least one of the pressed cells stored in the pressed cell table 141 (refer to FIG. 8) was acquired from the electronic writing device 20 in a different cycle from the cycle in which the pressed cells were identified at Step S127 (Step S135). In a case where none of the pressed cells stored in the pressed cell table 141 was acquired in a different cycle (NO at Step S135), the processing advances to Step S139. In a case where at least one of the pressed cells stored in the pressed cell table 141 was acquired in a different cycle from the cycle in which the pressed cells were identified at Step S127 (YES at Step S135), the CPU 11 changes the flag information from "O" to "X" for any of the pressed cells, among the at least one of the pressed cells acquired in a different cycle and stored in the pressed cell table 141, that is in the same position as one of the pressed cells in the area cell group specified at Step S133. The CPU 11 also adds "(5th)" to the flag information as information that indicates that the flag information was changed from "O" to "X" by the fifth specification processing. In this manner, the CPU 11 excludes from the writing cell candidates the pressed cells that are in the same positions as the cells in the area cell group (Step S137). The processing advances to Step S139.

The CPU 11 determines whether all of the pressed cells stored in the pressed cell table 141 for each cycle have been identified at Step S127 (Step S139). In a case where there remains in the pressed cell table 141 a pressed cell that has not been identified for a cycle at Step S127 (NO at Step S139), the processing returns to Step S127, in order for the processing at Steps S127 to S137 to be performed for the pressed cells for a different cycle. In a case where the pressed cells stored in the pressed cell table 141 for all of the cycles have been identified at step S127 (YES at Step S139), the fifth specification processing is terminated, and the processing returns to the main processing (refer to FIG. 9).

Thus, in the fifth specification processing, it is possible to prevent the pressed cells that are in the same positions as the cells in the area cell group from becoming the writing cell candidates. Because the CPU 11 is able to prevent the cells that are in an unstable state in which the first conductive layer 41 and the second conductive layer 42 can easily come into contact from becoming the writing cell candidates, the writing cell candidates can be specified in a stable manner.

As shown in FIG. 9, after the fifth specification processing (Step S29) has been terminated, the CPU 11 performs the sixth specification processing (refer to FIG. 24) (Step S31). In the sixth specification processing, the CPU 11 specifies how the writing coordinate candidates, that is, the cell coordinates included in each of the writing cell candidates that have been specified by the first specification processing to the fifth specification processing, have changed from one cycle to the next. The CPU 11 specifies the writing coordinate candidates for the ultimate setting of the designation coordinates.

A concrete explanation will be provided, using as an example a case in which the adjacency groups 61 to 65 (refer to FIG. 11) were acquired from the electronic writing device 20 in the cycle 0, and, as a result of the adjacency groups 63 to 65 being excluded from the writing cell candidates by the first specification processing to the fifth specification processing, the pressed cells included in the adjacency groups 61 and 62 have been specified as the writing cell candidates. Note that the writing cell candidates are specified by the first specification processing to the fifth specification processing in the same manner for the pressed cells acquired from the electronic writing device 20 in the cycles 1, 2, and the like as well.

The sixth specification processing will be explained with reference to FIG. 24. Among the pressed cells in the adjacency groups 61 and 62 stored in the pressed cell table 141 (refer to FIG. 8) in association with the cycle 0 and specified as the writing cell candidates, the CPU 11 identifies the pressed cells in the adjacency group 61 (Step S145). The CPU 11 then identifies the writing cell candidates among the pressed cells acquired in the cycles 1, 2, and the like that are different cycles from the cycle 0 (Step S147). The writing cell candidates are specifically the pressed cells that are in the same positions as the pressed cells (2, 3), (2, 4), (3, 3), and (3, 4) that are included in the identified adjacency group 61, as well as the pressed cells stored in the pressed cell table 141 in association with "O" as the flag information. Referring to the pressed cell table 141, the CPU 11 stores the time information and the cell coordinates that correspond to the identified pressed cells in the history table 133 (refer to FIG. 25) of the RAM 13 in association with the identified pressed cells (Step S149). The CPU 11 associates numbers (0, 1, 2, . . . N−1) sequentially with the time information, the pressed cells, and the cell coordinates stored in the history table 133.

Figure 24:
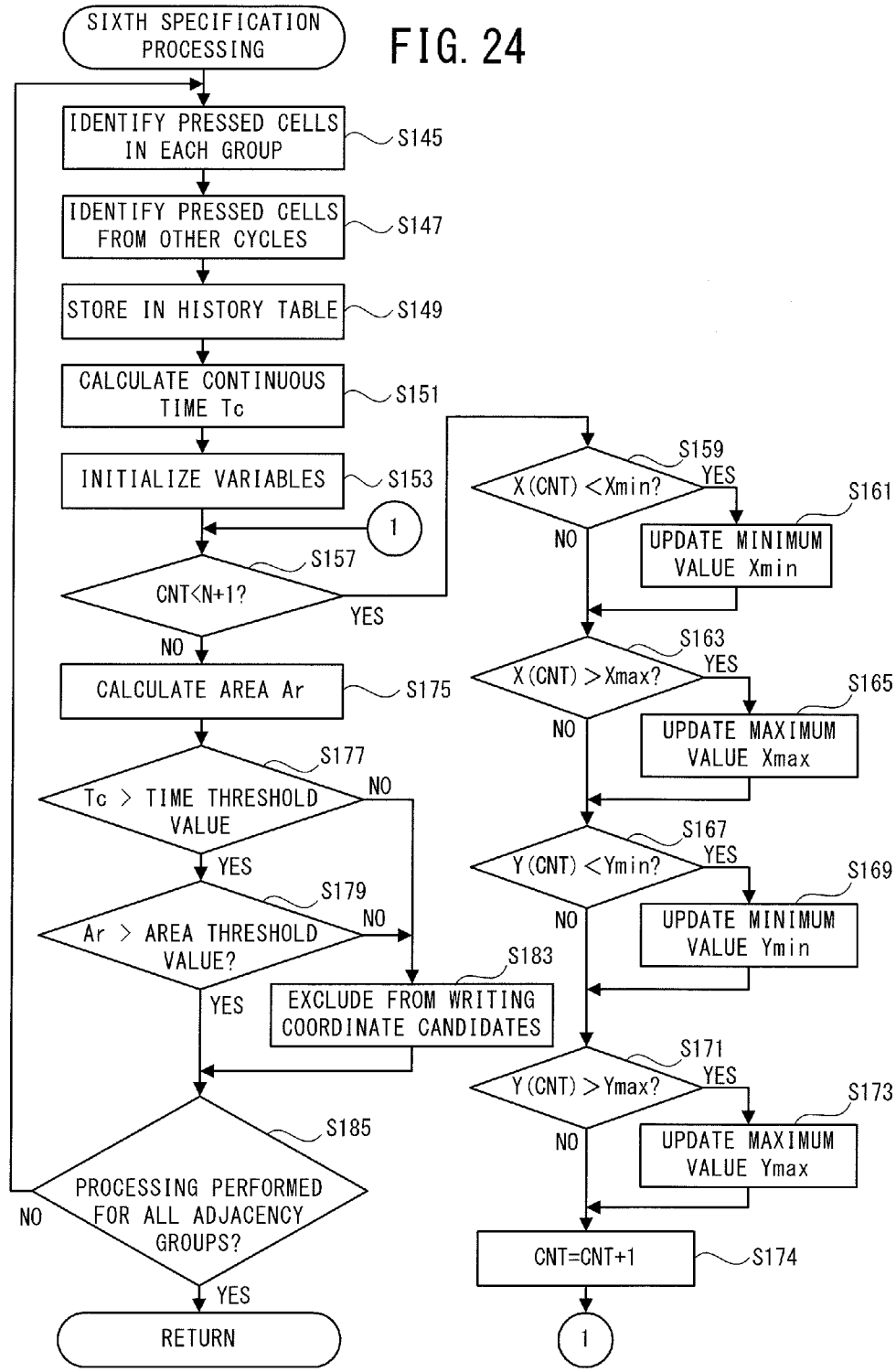
FIG. 24 is a flowchart of sixth specification processing.

As shown in FIG. 24, by subtracting the smallest time value from the largest time value among the times indicated by the time information stored in the pressed cell table 141 (refer to FIG. 8), the CPU 11 calculates a time Tc required for the writing operation for one stroke series (Step S151). Hereinafter, the time required for the writing operation for one stroke series will be referred to as the continuous time Tc. The pressed cells and the cell coordinates that indicate the positions pressed in the course of the writing operation for one stroke series are stored in the pressed cell table 141. The positions pressed in the course of the writing operation for one stroke series are specifically a series of positions pressed from the time that the pressing force was first applied to the touch panel 19, starting from a state in which the pressing force was not being applied, until the pressing force ceased to be applied. The calculated continuous time Tc indicates the time required for the writing operation for one stroke series. For example, in a case where the pressed cell table 141 in FIG. 8 is referenced, the continuous time 1.54 seconds is calculated by subtracting the smallest time value 0 seconds from the largest time value 1.54 seconds.

The CPU 11 initializes variables CNT, Ar, Xmin, Ymin, Xmax, Ymax that are stored in the RAM 13 by setting each of the variables to zero (Step S153). By comparing the variable CNT to a value N+1 that is calculated by adding 1 to a value N, the CPU 11 determines whether the processing has been performed for all of the cell coordinates stored in the history table 133 (refer to FIG. 25) (Step S157). In a case where the variable CNT is less than the value N+1 (YES at Step S157), the CPU 11 identifies the cell coordinates (X(CNT), Y(CNT)) for the CNT-th pressed cell in the history table 133. The CPU 11 compares the identified cell coordinate X(CNT) to a minimum value Xmin (Step S159). In a case where the cell coordinate X(CNT) is less than the minimum value Xmin (YES at Step S159), the CPU 11 updates the minimum value Xmin by setting the minimum value Xmin to the value of the cell coordinate X(CNT) (Step S161). The processing advances to Step S163. In a case where the minimum value Xmin is not greater than the cell coordinate X(CNT) (NO at Step S159), the processing advances to Step S163.

The CPU 11 compares the identified cell coordinate X(CNT) to a maximum value Xmax (Step S163). In a case where the cell coordinate X(CNT) is greater than the maximum value Xmax (YES at Step S163), the CPU 11 updates the maximum value Xmax by setting the maximum value Xmax to the value of the cell coordinate X(CNT) (Step S165). The processing advances to Step S167. In a case where the maximum value Xmax is not less than the cell coordinate X(CNT) (NO at Step S163), the processing advances to Step S167.

The CPU 11 compares the identified cell coordinate Y(CNT) to a minimum value Ymin (Step S167). In a case where the cell coordinate Y(CNT) is less than the minimum value Ymin (YES at Step S167), the CPU 11 updates the minimum value Ymin by setting the minimum value Ymin to the value of the cell coordinate Y(CNT) (Step S169). The processing advances to Step S171. In a case where the minimum value Ymin is not greater than the cell coordinate Y(CNT) (NO at Step S167), the processing advances to Step S171.

The CPU 11 compares the identified cell coordinate Y(CNT) to a maximum value Ymax (Step S171). In a case where the cell coordinate Y(CNT) is greater than the maximum value Ymax (YES at Step S171), the CPU 11 updates the maximum value Ymax by setting the maximum value Ymax to the value of the cell coordinate Y(CNT) (Step S173). The processing advances to Step S174. In a case where the maximum value Ymax is not less than the cell coordinate Y(CNT) (NO at Step S171), the processing advances to Step S174. At Step S174, the CPU 11 updates the variable CNT by adding 1 to the variable CNT (Step S174). The processing returns to Step S157.

The processing at Steps S159 to S174 is repeated based on the updated variable CNT. In a case where the variable CNT is not less than the value N+1 (NO at Step S157), the processing at Steps S159 to S174 is deemed to have been performed for all of the cell coordinates that are stored in the history table 133. Using the minimum values (Xmin, Ymin) and the maximum values (Xmax, Ymax), the CPU 11 defines a quadrilateral that has (Xmin, Ymin), (Xmax, Ymin), (Xmax, Ymax), and (Xmin, Ymax) as the coordinates of the corners. The defined quadrilateral is equivalent to a quadrilateral that encompasses all of the positions indicated by the cell coordinates included in the history table 133. Based on the formula below, the CPU 11 calculates an area Ar of the quadrilateral for which (Xmin, Ymin), (Xmax, Ymin), (Xmax, Ymax), and (Xmin, Ymax) are defined as the coordinates of the corners (Step S175).

$$Ar=(X\text{max}-X\text{min})\times(Y\text{max}-Y\text{min})$$

The CPU 11 determines whether the continuous time Tc calculated at Step S151 is greater than a specified time threshold value (Step S177). In many cases, a fixed length of time is required in order to perform the writing operation for one stroke series. Therefore, in a case where the continuous time Tc is not greater than the time threshold value, there is a strong possibility that the pressed cells included in the adjacency group 61 were not detected due to the user's performing of a pressing operation using the writing instrument 2. In a case where the continuous time Tc is not greater than the time threshold value (NO at Step S177), among all of the pressed cells stored in the pressed cell table 141 (refer to FIG. 8), the CPU 11 changes from "O" to "X" the flag information that is associated with the pressed cells (2, 3), (2, 4), (3, 3), and (3, 4) that are included in the adjacency group 61 and stored in the history table 133 (refer to FIG. 25). The CPU 11 also adds "(6th)" to the flag information as information that indicates that the flag information was changed from "O" to "X" by the sixth specification processing (Step S183). In this manner, the CPU 11 excludes from the writing coordinate candidates the cell coordinates of the pressed cells (2, 3), (2, 4), (3, 3), and (3, 4) in the adjacency group 61 that are the writing cell candidates. The processing advances to Step 185.

In a case where the continuous time Tc calculated at Step S151 is greater than the time threshold value (YES at Step S177), the CPU 11 determines whether the area Ar calculated at Step S175 is greater than a specified area threshold value (Step S179). The range of movement of the knuckles of the index finger of the hand 60 is assumed to be smaller than the range of movement of the writing instrument 2. In a case where the area Ar is less than the area threshold value, the coordinates are deemed not to have moved by a large amount. In a case where the area is not greater than the area threshold value (NO at Step S179), among all of the pressed cells stored in the pressed cell table 141, the CPU 11 changes from "O" to "X" the flag information that is associated with the pressed cells (2, 3), (2, 4), (3, 3), and (3, 4) in the adjacency group 61 stored in the history table 133. The CPU 11 also adds "(6th)" to the flag information as information that indicates that the flag information was changed from "O" to "X" by the sixth specification processing (Step S183). The processing advances to Step 185.

In a case where the area Ar calculated at Step S175 is greater than the area threshold value (YES at Step S179), the cell coordinates are deemed to have moved through a region that is larger than a region with the area indicated by the area threshold value. In a case where the user uses the writing instrument 2 to draw a text character, a diagram, or the like on the touch panel 19, there is a strong tendency for the range of movement of the writing coordinates to become larger. Therefore, in the pressed cell table 141, the CPU 11 specifies as the writing coordinate candidates the cell coordinates that correspond to the pressed cells in the adjacency group 61 stored in the history table 133. The processing advances to Step S185.

The CPU 11 determines whether, among the adjacency groups of the pressed cells stored in association with the cycle 0, the processing described above has been performed for the adjacency group 62, for which the processing has not been performed (Step S185). At this point, the processing described above has not been performed for the adjacency group 62 (NO at Step S185), so the processing returns to Step S145. In a case where the processing has been performed for the adjacency groups of the pressed cells stored in association with the cycle 0, the CPU 11 determines whether the processing described above has been performed for all of the adjacency groups of the pressed cells stored in association with the cycles 1, 2, and the like that are different from the cycle 0. In a case where the processing described above has not been performed for even one of the adjacency groups of the pressed cells stored in association with the cycles 1, 2, and the like that are different from the cycle 0 (NO at Step S185), the processing returns to Step S145. In a case where the processing described above has been performed for all of the adjacency groups of the pressed cells acquired in the cycles 0, 1, and the like (YES at Step S185), the sixth specification processing is terminated, and the processing returns to the main processing (refer to FIG. 9).

For example, as a result of the sixth specification processing for the adjacency groups 61 and 62, in a case where the area Ar calculated based on the pressed cells included in the adjacency group 62 is smaller than the area threshold value (NO at Step S179) and the area Ar calculated based on the pressed cells included in the adjacency group 61 is greater than the area threshold value (YES at Step S179), the cell coordinates that correspond to the pressed cells included in the adjacency group 62 are excluded from the writing coordinate candidates (Step S183). Accordingly, only the cell coordinates that correspond to the pressed cells included in the adjacency group 61 remain as the writing coordinate candidates. The cell coordinates that are the writing coordinate candidates at the point when the sixth specification processing is terminated will be used in processing for setting the designation coordinates, which will be described later.

As described above, in the sixth specification processing, the CPU 11, based on the writing cell candidates specified by the first specification processing to the fifth specification processing, specifies a change tendency in the area Ar of a region that encompasses a plurality of cell coordinates. Based on the specified change tendency, the CPU 11 distinguishes between the cell coordinates that indicate a position where the user has used the writing instrument 2 to press on the touch panel 19 and the cell coordinates that indicate a position where the user has used something other than the writing instrument 2 to press on the touch panel 19. The cell coordinates that indicate a position pressed by the writing instrument 2 are defined as the writing coordinate candidates. The CPU 11 is thus able to specify the writing coordinate candidates appropriately.

As shown in FIG. 9, after the sixth specification processing (Step S31) has been terminated, the CPU 11 identifies, among the cell coordinates stored in the pressed cell table 141 (refer to FIG. 8), the cell coordinates that correspond to the writing coordinate candidates, identifying the cell coordinates for each of the adjacency groups that include the pressed cells in which those cell coordinates are located. The cell coordinates that correspond to the writing coordinate candidates are specifically the cell coordinates with which "O" is associated as the flag information. The CPU 11 ultimately sets the designation coordinates based on the identified cell coordinates (Step S33). The designation coordinates are specifically the coordinate information that indicates the positions pressed by the writing instrument 2. In a case where the pressed cell that corresponds to the cell coordinates that correspond to the writing coordinate candidates is not adjacent to any of the other pressed cells, the one set of the cell coordinates is set as the designation coordinates (Step S33). In other words, in a case where the pressed cell that corresponds to the cell coordinates that correspond to one of the writing coordinate candidates is disposed in isolation from the other pressed cells, the one set of the cell coordinates is set as the designation coordinates. The processing returns to Step S11.

This will now be explained in concrete terms. In the pressed cell table 141 (refer to FIG. 8), the CPU 11 identifies the cell coordinates that correspond to the writing coordinate candidates, identifying the cell coordinates for each of the adjacency groups that include the pressed cells that correspond to the cell coordinates that are the writing coordinate candidates. The CPU 11 converts each of the identified sets of the cell coordinates into coordinate information for the entire touch panel 19. Hereinafter, the coordinate information for the entire touch panel 19 will be referred to as the global coordinates. The reference position for the global coordinates is the lower left corner of the touch panel 19. In the pressed cell table 141 (refer to FIG. 8), the CPU 11 specifies the coordinate information for the lower left corner of the pressed cell that corresponds to the identified cell coordinates. The CPU 11 converts the cell coordinates into the global coordinates by adding the specified coordinate information to the cell coordinates. The CPU 11 specifies the global coordinates by converting the individual cell coordinates identified for each of the adjacency groups. The CPU 11 calculates the mean value of the identified cell coordinates. The CPU 11 sets the calculated mean value as the designation coordinates that correspond to the adjacency group.

Thus, by defining the designation coordinates to be the mean value of cell coordinates that have been specified as the writing coordinate candidates, the CPU 11 is able to derive the designation coordinates appropriately from the plurality of cell coordinates. Moreover, the accuracy of the specified designation coordinates can be stabilized, even in a case where there is dispersion among the cell coordinates.

The present disclosure is not limited to the embodiment described above, and various types of modifications can be made. The writing operation on the touch panel 19 may also be performed using something other than the writing instrument 2. For example, the writing operation may also be performed using a finger (for example, the index finger).

The present disclosure can also be applied to a system that uses a known resistance film type of touch panel that has only one intersecting electrode. The present disclosure can also be applied to a system that uses another type of touch panel, such as a matrix switch type, a surface acoustic wave type, an infrared light type, an electromagnetic induction type, an electrostatic capacitance type, or the like, for example.

The present disclosure may also be modified such that the CPU 21 in the electronic writing device 20 specifies the designation coordinates by performing the same sort of processing as the CPU 11.

Figure 26:
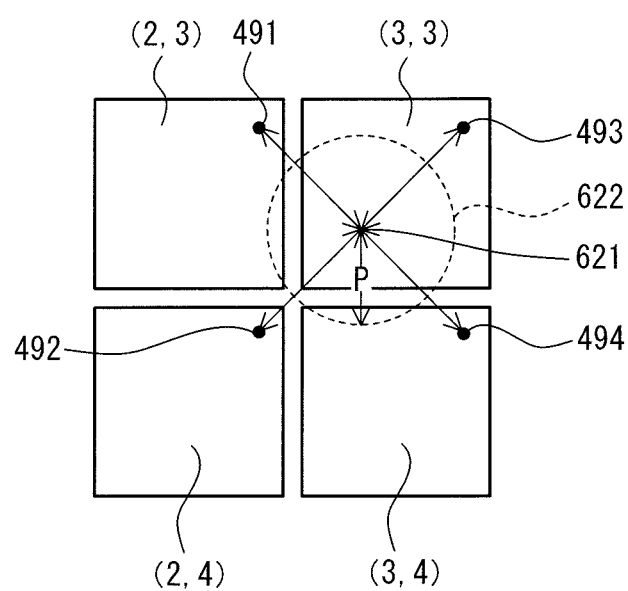
FIG. 26 is a figure that shows an effective range.

In the second specification processing (refer to FIG. 14), the CPU 11 may also define a reference point that is different from the first reference point 615. For example, the CPU 11 may calculate the mean value coordinates for a group of cell coordinates 491 to 494 in the pressed cells (2, 3), (2, 4), (3, 3), and (3, 4), then define as a second reference point 621 the point indicated by the mean value coordinates, as shown in FIG. 26. The CPU 11 may also define as an effective range 622 the area within a circle of the radius P that has the center at the second reference point 621. The CPU 11 may specify, as the writing cell candidates, the pressed cells that include the cell coordinates that are inside the defined effective range 622 and may exclude from the writing cell candidates the pressed cells that include the cell coordinates that are outside of the defined effective range 622.

Given that the second reference point 621 has been defined as described above, in a case where the distance from the second reference point 621 to a position indicated by cell coordinates is short, there is a strong possibility that the position indicated by the cell coordinates has been pressed by the writing instrument 2, in the same manner as in the case that was previously explained with respect to the first reference point 615. In a case where the distance from the second reference point 621 to a position indicated by cell coordinates is long, there is a strong possibility that the position indicated by the cell coordinates has not been pressed by the writing instrument 2. The CPU 11 determines that the pressed cell that includes the cell coordinates whose distance from the second reference point 621 is short is a valid writing cell candidate. The CPU 11 is thus able to specify more appropriately the position pressed by the writing instrument 2.

In the second specification processing (refer to FIG. 14), the CPU 11 specifies as the writing cell candidates the pressed cells that include the cell coordinates whose distances from the first reference point 615 are not greater than the reference threshold value (YES at Step S77; Step S79), and the CPU 11 also specifies as the writing cell candidates the pressed cells that include the cell coordinates for which the distances between the cell coordinates are not greater than the relative threshold value. In addition, the CPU 11 may also specify as the writing cell candidates the pressed cells that include the cell coordinates whose distances from the second reference point 621 are not greater than the reference threshold value.

At Step S33 in the main processing (refer to FIG. 9), the CPU 11 may also refer to the pressing forces for the pressed cells with which "O" is associated as the flag information in the pressed cell table 141, that is, the pressed cells that are the writing cell candidates. The CPU 11 may set, as the designation coordinates, the cell coordinates of the pressed cell associated with the greatest pressing force among the pressing forces that correspond to the pressed cells included in the same adjacency group. The pressed cell that is associated with the greatest pressing force among the pressing forces that correspond to the pressed cells included in the same adjacency group is specifically the pressed cell pressed by the greatest pressing force among the pressed cells included in the same adjacency group. The cell coordinates within the pressed cell pressed by the greatest pressing force correspond to the position pressed by the writing instrument 2 most strongly within the region indicated by the adjacency group. The CPU 11 is therefore able to set more appropriately as the designation coordinates the coordinates of the position that is the closest to the position that the user designated using the writing instrument 2.

Figure 19:
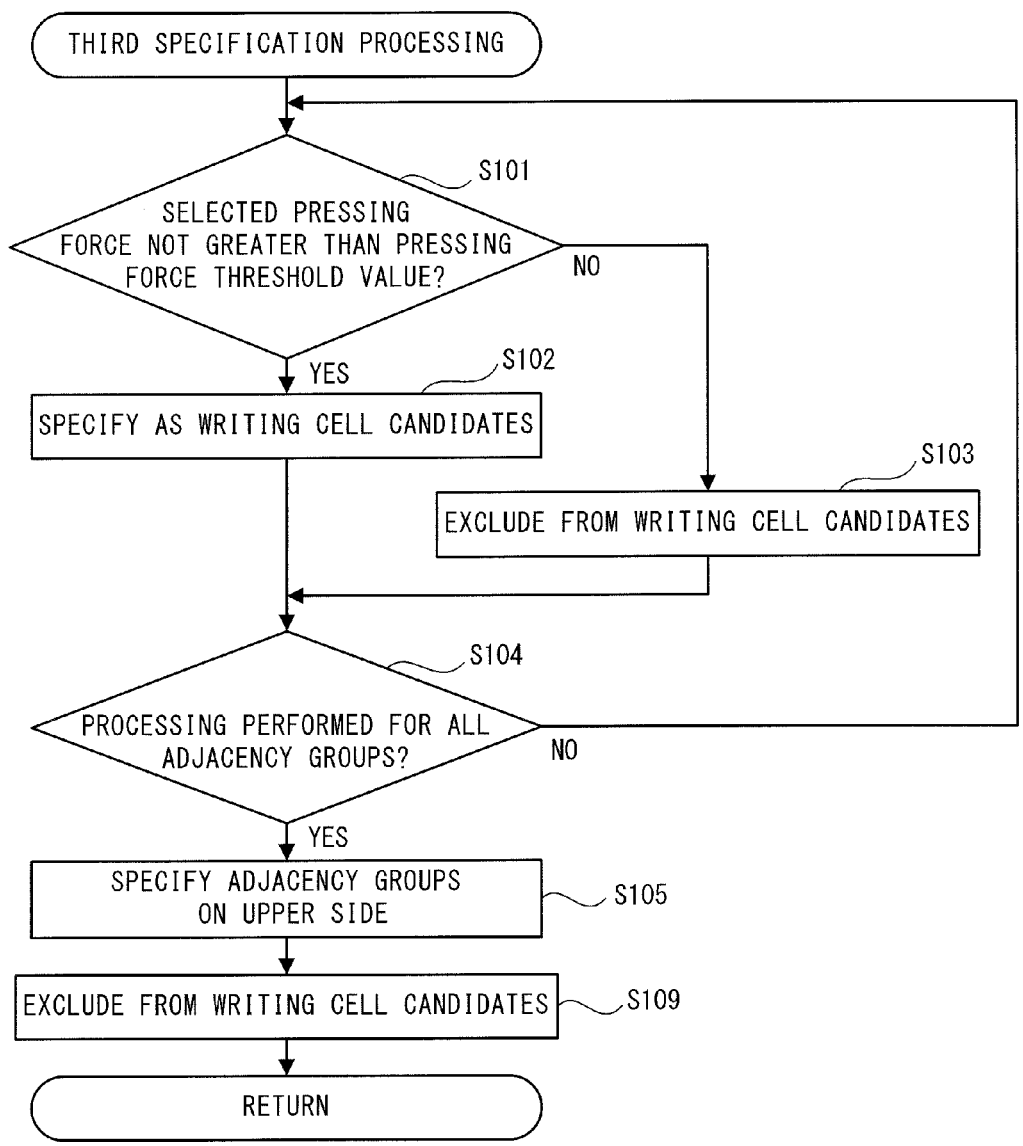
FIG. 19 is a flowchart of third specification processing.

As explained previously, the pressed cells pressed by the pressing forces that are greater than the pressing force threshold value have been excluded from the writing cell candidates (Step S103; refer to FIG. 19). Therefore, the upper limit on the pressing forces that correspond to the pressed cells with which "O" is associated as the flag information in the pressed cell table 141, that is, the pressed cells that are the writing cell candidates, is the pressing force threshold value. Therefore, the greatest pressing force specified at Step S33 is the pressing force threshold value. There is a strong possibility that, in a case where the touch panel 19 is pressed by the writing instrument 2, the pressing force is the pressing force threshold value. Therefore, the CPU 11 is able to set the designation coordinates more accurately.

In the sixth specification processing (refer to FIG. 24), the CPU 11 may also sequentially connect positions indicated by the cell coordinates by line segments and then specify, as the change tendency, the overall length of the line segments. The CPU 11 may also specify, as the change tendency, in the number of the cell coordinates disposed within a specified distance from the position indicated by the mean value of the cell coordinates. The CPU 11 may also calculate the dispersion of the cell coordinates in the X axis direction and the Y axis direction and then specify the dispersion as the change tendency in. The CPU 11 may also specify the writing coordinate candidates based on the change tendencies.

In the embodiment described above, the pressing forces applied to the pressed cells are detected by the pressure sensors 51, but the pressing forces may also be detected by another method. For example, the CPU 11 may also determines the pressing forces for the individual pressed cells based on the way that the pressed cells are arrayed within the adjacency groups. As another example, the CPU 11 may also calculate a contact resistance for each of the pressed cells based on the voltage applied by the voltage application portion 38 and the voltage detected by the voltage detection portion 39, then multiply the contact resistance by a conversion coefficient and specify the result as the pressing force.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A panel control device, comprising:
    a processor configured to perform processes comprising:
        acquiring a plurality of pressed cells and a plurality of cell coordinates, the plurality of pressed cells being a plurality of cells, among pluralities of cells that divide a panel into a plurality of regions, to which pressing force is applied simultaneously, and each of the plurality of cell coordinates being coordinate information that indicates a position of a center of gravity of an area, of one of the pressed cells, to which the pressing force has been applied;
        specifying, as at least one candidate cell, at least one of the plurality of pressed cells based on positional relationships among the plurality of cell coordinates included in an adjacency group, the adjacency group being a plurality of pressed cells that are adjacent to one another; and
        specifying designation coordinates based on cell coordinates, among the plurality of cell coordinates, that indicates a position within the at least one candidate cell, the designation coordinates being coordinate information that indicates a position on the panel designated by being pressed by a user,
    wherein
    the processor is further configured to perform processes of:
        specifying an extent of separation between two of the pressed cells for every pair of the pressed cells that are included in the plurality of pressed cells; and
        identifying, among the plurality of pressed cells, a plurality of pressed cells for which the specified extents of separation satisfy a specified condition,
    the specifying the at least one candidate cell includes specifying the at least one candidate cell based on positional relationships among a plurality of positions within the identified plurality of pressed cells, the plurality of positions being indicated by a plurality of cell coordinates included in the identified plurality of pressed cells,
    the acquiring the plurality of pressed cells and the plurality of cell coordinates includes:
        acquiring a plurality of pressed cells repeatedly in cycles; and
        storing in a storage portion, in each of the cycles, the plurality of pressed cells acquired in a cycle,
    the processor is further configured to perform a process of:
        invalidating, in a case where a plurality of pressed cells satisfying the specified condition are identified among the plurality of pressed cells acquired in a first cycle, the pressed cells, among the plurality of pressed cells acquired and stored in the storage portion in a second cycle, that are not disposed in the same positions as the identified pressed cells, the second cycle being a different cycle from the first cycle, and
    the specifying the designation coordinates includes specifying the destination coordinates based on the cell coordinates within the pressed cells that are among the at least one candidate cell, exclusive of the invalidated pressed cells.

2. The panel control device according to claim 1, wherein the specifying the at least one candidate cell includes
    calculating a distance between two of the cell coordinates for every pair of the cell coordinates that are included in the plurality of cell coordinates, and
    specifying, as the at least one candidate cell, at least one of the pressed cells that includes a pair of cell coordinates for which the calculated distance is not greater than a relative threshold value that is a specified value.

3. The panel control device according to claim 1, wherein the specifying the at least one candidate cell includes specifying, as the at least one candidate cell, at least one of the pressed cells that includes cell coordinates that indicates a position whose distance from a first reference point is not greater than a reference threshold value that is a specified value, the first reference point being a point that is set in a boundary region among a plurality of adjacent cells that are included in the adjacency group.

4. The panel control device according to claim 1, wherein the specifying the at least one candidate cell includes specifying, as the at least one candidate cell, at least one of the pressed cells that includes cell coordinates that indicates a position whose distance from a second reference point is not greater than a reference threshold value that is a specified value, the second reference point being a point that is indicated by mean value coordinates whose values are the averages of cell coordinates that indicate positions within the plurality of pressed cells that are included in the adjacency group.

5. The panel control device according to claim 1, wherein the processor is further configured to perform a process of:
    acquiring a pressing force magnitude for each one of the plurality of pressed cells, the pressing force magnitude being the magnitude of the force that pressed on the panel,
    wherein
    the specifying the at least one candidate cell includes specifying, as the at least one candidate cell, a plurality of pressed cells that are included in the adjacency group, in a case where the pressing force magnitude for the plurality of pressed cells included in the adjacency group satisfy a specified condition.

6. The panel control device according to claim 5, wherein the specifying the designation coordinates includes specifying, as the designation coordinates, the cell coordinates that indicates a position within the pressed cell for which the pressing force magnitude is the greatest among the at least one candidate cell.

7. The panel control device according to claim 1, wherein the specifying the designation coordinates includes specifying, as the designation coordinates, mean value coordinates whose values are the averages of the plurality of cell coordinates that indicate positions within the at least one candidate cell within the adjacency group.

8. The panel control device according to claim 1, wherein the specifying the designation coordinates includes
    specifying a change tendency of a plurality of positions within the at least one candidate cell, from among a plurality of positions that are indicated by the plurality of cell coordinates, and specifying the designation coordinates based on the cell coordinates that indicate a plurality of positions for which the change tendency satisfies a specified condition.

9. A panel control method, comprising:

acquiring a plurality of pressed cells and a plurality of cell coordinates, the plurality of pressed cells being a plurality of cells, among pluralities of cells that divide a panel into a plurality of regions, to which pressing force is applied simultaneously, and each of the plurality of cell coordinates being coordinate information that indicates a position of a center of gravity of an area, of one of the pressed cells, to which the pressing force has been applied;

specifying, as at least one candidate cell, at least one of the plurality of pressed cells based on positional relationships among the plurality of cell coordinates included in an adjacency group, the adjacency group being a plurality of pressed cells that are adjacent to one another; and specifying designation coordinates based on cell coordinates, among the plurality of cell coordinates, that indicates a position within the at least one candidate cell, the designation coordinates being coordinate information that indicates a position on the panel designated by being pressed by a user, wherein the method further comprises:

specifying an extent of separation between two of the pressed cells for every pair of the pressed cells that are included in the plurality of pressed cells; and identifying, among the plurality of pressed cells, a plurality of pressed cells for which the specified extents of separation satisfy a specified condition, the specifying the at least one candidate cell includes specifying the at least one candidate cells based on positional relationships among a plurality of positions within the identified plurality of pressed cells, the plurality of positions being indicated by a plurality of cell coordinates included in the identified plurality of pressed cells, the acquiring the plurality of pressed cells and the plurality of cell coordinates includes:

acquiring a plurality of pressed cells repeatedly in cycles; and storing in a storage portion, in each of the cycles, the plurality of pressed cells acquired in a cycle, the method further comprises:

invaliding, in a case where a plurality of pressed cells satisfying the specified condition are identified among the plurality of pressed cells acquired in a first cycle, the pressed cells, among plurality of pressed cells acquired and stored in the storage portion in a second cycle, that are not disposed in the same positions as the identified pressed cells, the second cycle being a different cycle from the first cycle, and the specifying the designation coordinates includes specifying the designation coordinates based on the cell coordinates within the pressed cells that are among the at least one candidate cell, exclusive of the invalidated pressed cells.

10. A non-transitory computer-readable medium storing computer-readable instructions that cause a device to perform the steps of:

acquiring a plurality of pressed cells and a plurality of cell coordinates, the plurality of pressed cells being a plurality of cells, among pluralities of cells that divide a panel into a plurality of regions, to which pressing force is applied simultaneously, and each of the plurality of cell coordinates being coordinate information that indicates a position of a center of gravity of an area, of one of the pressed cells, to which the pressing force has been applied;

specifying, as at least one candidate cell, at least one of the plurality of pressed cells based on positional relationships among the plurality of cell coordinates included in an adjacency group, the adjacency group being a plurality of pressed cells that are adjacent to one another; and specifying designation coordinates based on cell coordinates, among the plurality of cell coordinates, that indicates a position within the at least one candidate cell, the designation coordinates being coordinate information that indicates a position on the panel designated by being pressed by a user, wherein the instructions further cause the device to perform the steps of:

specifying an extent of separation between two of the pressed cells for every pair of the pressed cells that are included in the plurality of pressed cells; and identifying, among the plurality of pressed cells, a plurality of pressed cells for which the specified extents of separation satisfy a specified condition, the specifying the at least one candidate cell includes specifying the at least one candidate cell based on positional relationships among a plurality of positions within the identified plurality of pressed cells, the plurality of positions being indicated by a plurality of cell coordinates included in the identified plurality of pressed cells, the acquiring the plurality of pressed cells and the plurality of cell coordinates includes:

acquiring a plurality or pressed cells repeatedly in cycles; and storing in a storage portion, in each of the cycles, the plurality of pressed cells acquired in a cycle, the instructions further cause the device to perform the step of:

invalidating, in a case where a plurality of pressed cells satisfying the specified condition are identified among the plurality of pressed cells acquired in a first cycle, the pressed cells, among the plurality of pressed cells acquired and stored in the storage portion in a second cycle, that are not disposed in the same positions as the identified pressed cells, the second cycle being a different cycle from the first cycle, and the specifying the designation coordinates includes specifying the designation coordinates based on the cell coordinates within the pressed cells that are among the at least one candidate cell, exclusive of the invalidated pressed cells.

* * * * *